(12) United States Patent
Nayak et al.

(10) Patent No.: US 10,721,199 B2
(45) Date of Patent: Jul. 21, 2020

(54) MESSAGE DRIVEN DATA UPDATES

(71) Applicant: CenturyLink Intellectual Property LLC, Broomfield, CO (US)

(72) Inventors: Srikanth Nayak, Udupi District (IN); Santhosh Plakkatt, Bangalore (IN)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

(21) Appl. No.: 16/378,332

(22) Filed: Apr. 8, 2019

(65) Prior Publication Data

US 2019/0238491 A1 Aug. 1, 2019

Related U.S. Application Data

(62) Division of application No. 14/805,112, filed on Jul. 21, 2015, now Pat. No. 10,257,145.

(60) Provisional application No. 62/081,707, filed on Nov. 19, 2014.

(51) Int. Cl.
| | |
|---|---|
| *H04L 12/58* | (2006.01) |
| *H04W 4/14* | (2009.01) |
| *H04W 4/12* | (2009.01) |
| *H04L 29/06* | (2006.01) |

(52) U.S. Cl.
CPC .............. *H04L 51/18* (2013.01); *H04W 4/14* (2013.01); *H04L 51/04* (2013.01); *H04L 51/046* (2013.01); *H04L 51/08* (2013.01); *H04L 51/14* (2013.01); *H04L 51/16* (2013.01); *H04L 51/38* (2013.01); *H04L 63/08* (2013.01); *H04L 63/10* (2013.01); *H04W 4/12* (2013.01)

(58) Field of Classification Search
CPC ......... H04L 51/38; H04L 51/30; H04L 51/32; H04L 51/066; H04L 51/046; H04L 51/14; H04L 51/18; H04L 51/04; H04L 51/16; H04L 51/08; H04L 63/10; H04L 63/08; H04W 4/14; H04W 4/12
See application file for complete search history.

(56) References Cited

U.S. PATENT DOCUMENTS

| | | | |
|---|---|---|---|
| 8,433,297 B2 | 4/2013 | Ramer | |
| 2006/0234734 A1* | 10/2006 | Kim | H03M 7/40 455/466 |
| 2007/0087765 A1* | 4/2007 | Richardson | H04W 4/14 455/466 |

(Continued)

*Primary Examiner* — Jungwon Chang

(57) ABSTRACT

Novel tools and techniques might be provide for implementing message-driven data updates. In some embodiments, a server might generate linear (e.g., short message service ("SMS")) message(s) containing data updates, and might send the linear message(s) to a user device over a linear messaging communications network. The user device might receive the linear message containing data updates, and might divert, based on the format of the linear message, the linear message, from a queue of regular (i.e., message only) linear messages that are displayed to a user, to a translator device or application programming interface ("API"). The translator or API might parse the data updates in the linear message (in some cases, combining data updates in multiple linear messages, decrypting data updates, and/or the like) to generate data updates in data format, which are then relayed to one or more identified applications running on the user device for updating these applications.

19 Claims, 17 Drawing Sheets

(56) References Cited

U.S. PATENT DOCUMENTS

| | | | |
|---|---|---|---|
| 2008/0182601 A1* | 7/2008 | Cho | H04L 51/38 |
| | | | 455/466 |
| 2011/0244845 A1* | 10/2011 | Park | H04M 1/72552 |
| | | | 455/419 |
| 2013/0005346 A1* | 1/2013 | Chu | H04W 4/12 |
| | | | 455/450 |
| 2014/0194112 A1 | 7/2014 | Ngo | |
| 2014/0357285 A1 | 12/2014 | Smith | |
| 2015/0304389 A1 | 10/2015 | Chiussi | |
| 2015/0378714 A1 | 12/2015 | Katariya | |
| 2016/0142356 A1 | 5/2016 | Srikanth et al. | |

* cited by examiner

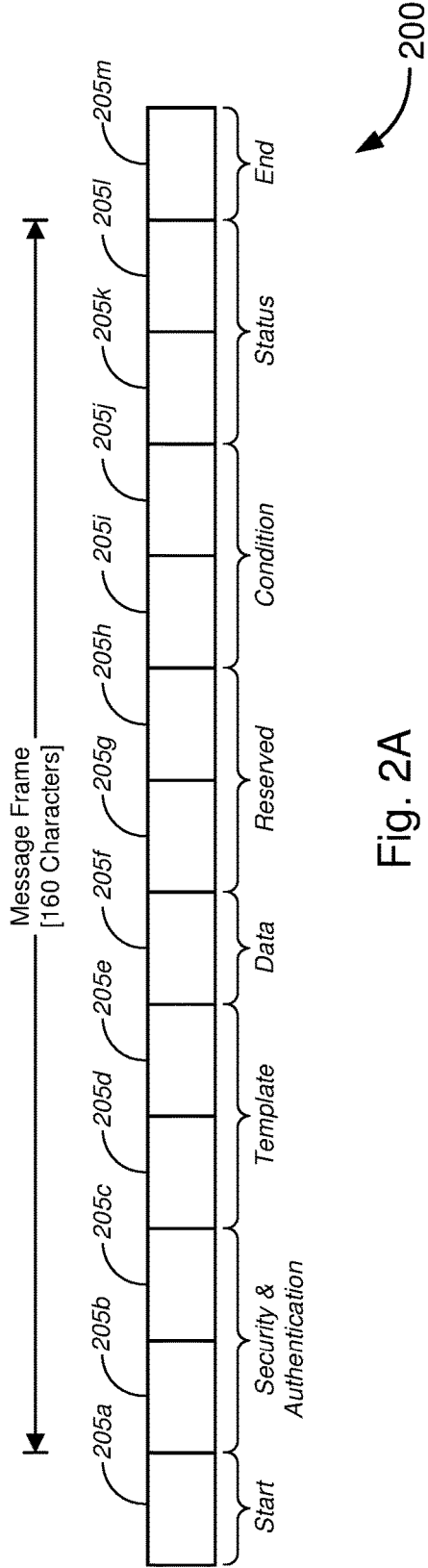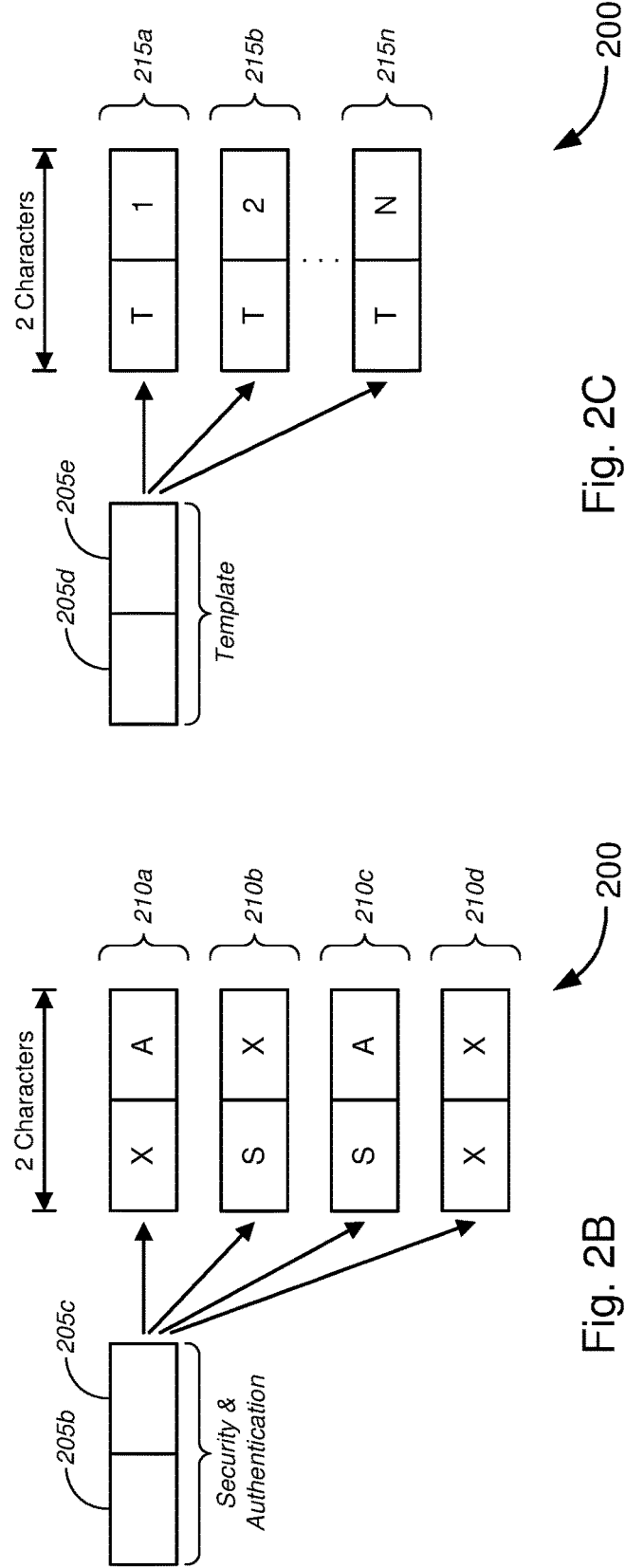

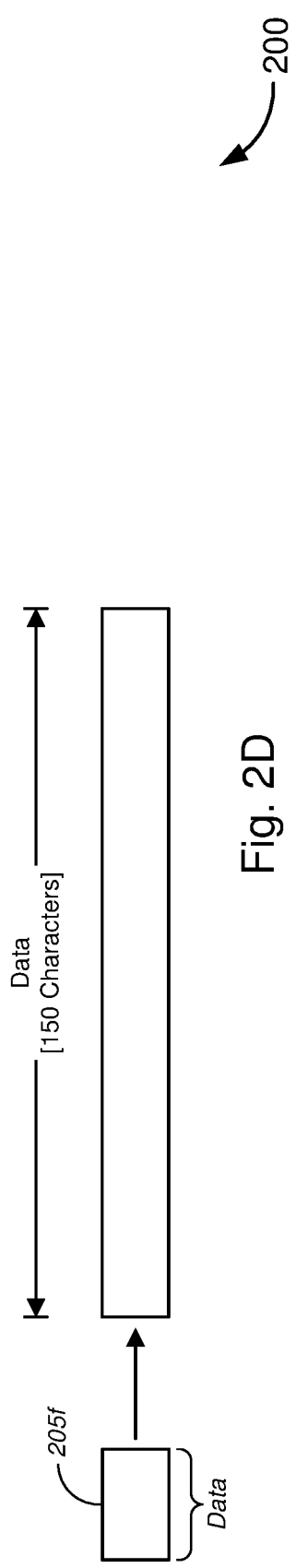
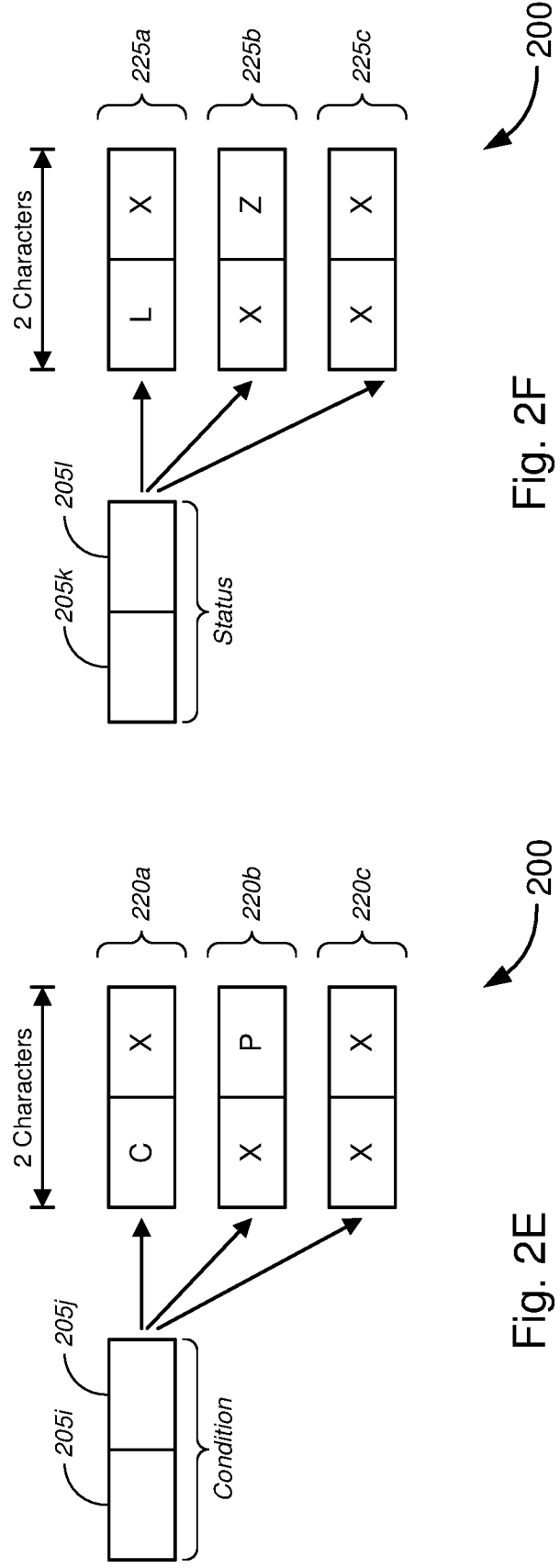
Fig. 2D
Fig. 2E
Fig. 2F

MESSAGE DRIVEN DATA UPDATES

CROSS-REFERENCES TO RELATED APPLICATIONS

This application is a Divisional of U.S. patent application Ser. No. 14/805,112 (the "'112 Application"), filed Jul. 21, 2015 by Srikanth Nayak et al., entitled, "Message Driven Data Updates," which claims priority to U.S. Patent Application Ser. No. 62/081,707 (the "'707 Application"), filed Nov. 19, 2014 by Srikanth Nayak et al., entitled, "Message Driven Data Updates," the disclosures of which are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing data updates, and, in particular embodiments, to methods, systems, and computer software for implementing message-driven data updates.

BACKGROUND

For my applications running on user devices (such as tablet computers, smart phones, laptop computers, mobile phones, portable gaming devices, or the like), data or data updates (e.g., application updates, service updates, security updates, etc.) are often needed to ensure that the applications are running efficiently, and/or using the most up-to-date software settings, configurations, data, etc.

When a user (and the user device) enters an area in which there is no/low data network connectivity or no/low data network availability, however, the applications cannot be updated during the time the user (and the user device) remains in such an area (herein referred to as a "data not available" or "DNA" zone).

Linear messages (e.g., short message service ("SMS") messages), on the other hand, utilize a different network from the data network, and are often able to be sent to and from user devices despite the lack of data network service, connectivity, or availability.

Hence, there is a need for more robust and scalable solutions for implementing data updates, by, e.g., implementing message-driven data updates that, in some cases, utilize protocols for data transmission through linear (e.g., SMS) messaging.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 2A-2I is a block diagram illustrating various embodiments of a message data framework that may be used when implementing message-driven data updates.

DETAILED DESCRIPTION OF CERTAIN EMBODIMENTS

Overview

Figure 1:
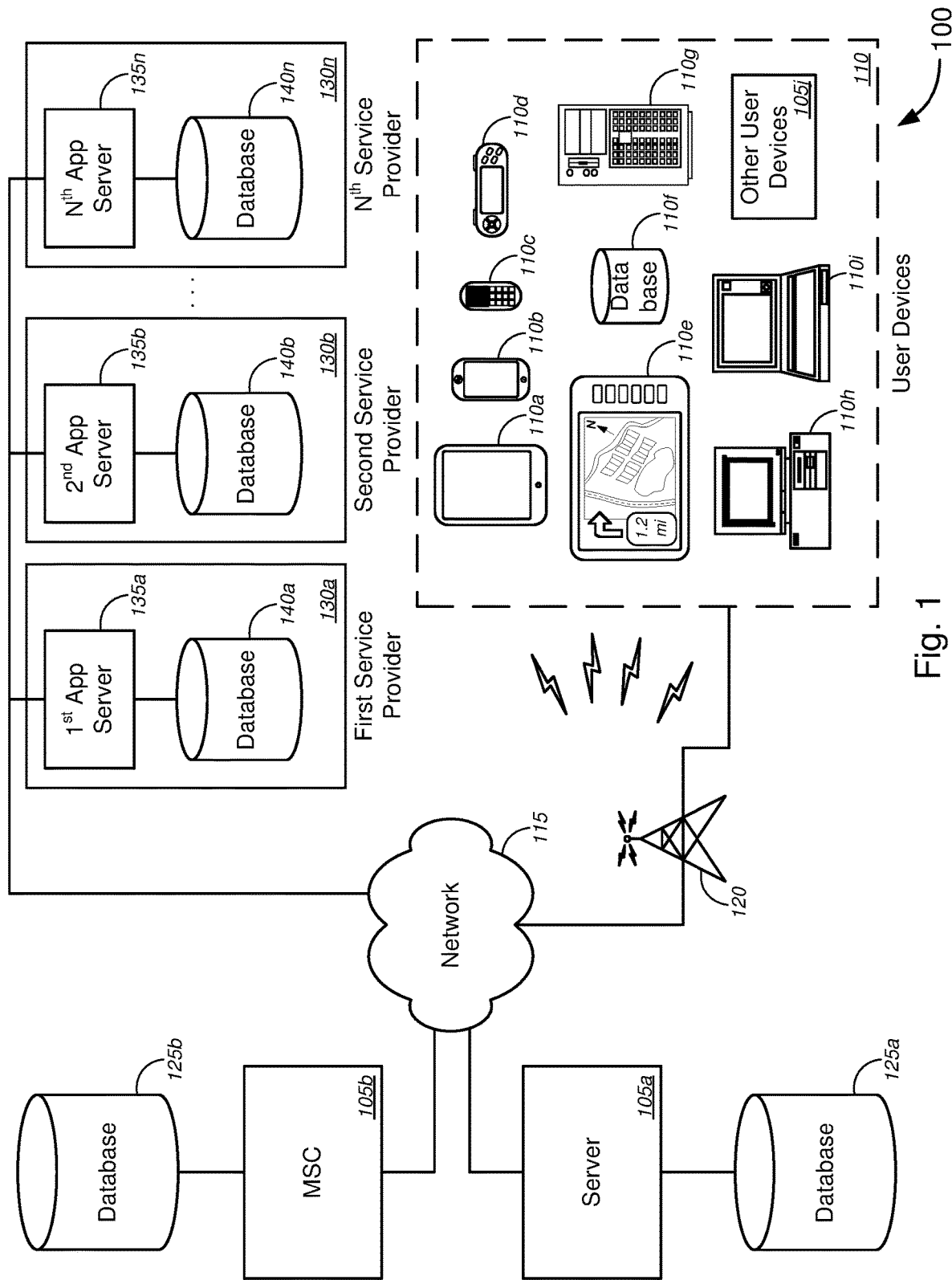
FIG. 1 is a schematic diagram illustrating a system for implementing message-driven data updates, in accordance with various embodiments.

Various embodiments provide techniques for implementing message-driven data updates that, in some cases, utilize protocols for data transmission through short message service ("SMS") messaging or through other linear messaging formats.

In some embodiments, a server might generate linear message(s) (e.g., short message service ("SMS") message(s) or the like) containing data updates (in linear messaging format), and might send the linear message(s) to a user device over a linear messaging communications network (e.g., SMS communications network). The user device might receive the linear message containing data updates, and might divert, based on the format of the linear message, the linear message, from a queue of regular (i.e., message only) linear messages that are displayed to a user, to a translator device or application programming interface ("API"). The translator or API might parse the data updates in the linear message to generate data updates in data format, which are then relayed to one or more identified applications running on the user device for updating these applications.

According to some embodiments, a message data framework ("MDF"), which might include the translator or API and might implement the message-driven data updates, might check whether the data or data updates is encrypted. If so, the MDF might decrypt the data or data updates. In some cases, the MDF might check whether the data or data updates are sent from a trusted source. If not, the MDF might reject the linear message(s) containing the data or data updates. In some instances, the MDF might check whether the user or user device is registered. If not, the MDF might hold off on translating the data or data updates in linear messaging format to data or data updates in data format, until the user or user device has been registered. The MDF, in some embodiments, might check whether the data or data updates are contained in two or more linear messages. If so, the MDF might stitch together or compile the two or more portions of the data or data updates in the two or more linear messages into a single, complete set of data or data updates. Merely by way of example, in some cases, the MDF might check whether the data or data updates represent current or old (i.e., archived) data or data updates. Unless old (or archived) data or data updates are specifically requested by an application, only current data or data updates are translated into data format and relayed to one or more identified applications. In some instances, MDF might check whether data or data updates are set as priority data or data updates. If so, the MDF might put the priority data or data updates in queue for translation and relay to applications ahead of other data or data updates (which might have been received before the priority data or data updates were received).

Because linear messages (e.g., short message service ("SMS") messages) utilize a different network from the data network, and are often able to be sent to and from user devices despite the lack of data network service, connectivity, or availability, data or data updates contained within linear (e.g., SMS) messages (i.e., data or data updates in linear (e.g., SMS) messaging format) may be sent to and from user devices, regardless of whether the user devices are in a "data not available" ("DNA") zone. Accordingly, applications running on the user devices can receive important data or data updates (including, without limitation, application updates, service updates, security updates, data updates, data, etc.) in a timely and expedited manner, regardless of whether the user devices are in a DNA zone. In some cases, particularly where users' mobile service subscriptions specify high volume or unlimited text or SMS message options, but have limited or capped data options, sending data or data updates to user devices associated with such users might represent a cheaper manner of updating applications running on the user devices.

Aside from data or data updates, according to some aspects, social media messages, emergency messages, presence-based messages, and/or the like may be embedded within linear (e.g., SMS) messages, and may be sent to and from the user devices (via the MDF), regardless of whether the user devices are in a DNA zone.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, network communications technology, linear messaging (e.g., SMS) technology, application updating technology, user or client device technology, and/or the like. In other aspects, certain embodiments, can improve the functioning of a computer or network system itself (e.g., user devices or computing devices/systems on which applications are running and require periodic or subsequent updating, etc.), for example, by enabling implementation of data updates via linear messaging transmission of the data updates (i.e., message-driven data updating), by enabling applications running on user devices to be updated regardless of whether the user devices are in DNA zones, and/or the like, thereby improving user device, application, network, and/or computing system functionalities or improving user device, application, network, and/or computing system efficiencies, and/or the like. In particular, to the extent that any abstract concepts are present in the various embodiments, those concepts can be implemented as described herein by devices, software, systems, and methods that involve specific novel functionality (e.g., steps or operations), such as implementing message-driven data updating, enabling applications running on user devices to be updated regardless of whether the user devices are in DNA zones, and/or the like, to name a few examples, that extend beyond mere conventional computer processing operations. These functionalities can produce tangible results outside of the implementing computer system, including, merely by way of example, ability to receive data updates for updating applications running on user devices despite the user devices being in DNA zones, improved user device, application, network, and/or computing system operations, improved user device, application, network, and/or computing system operation efficiencies, and/or the like, any of which may be observed or measured by customers and/or service providers.

In an aspect, a method might comprise generating, with a first computer, a short message service ("SMS") message containing data updates. The SMS message might have a format that triggers a data update analyzer in a user device to intercept the SMS message, to divert the SMS message from a queue of regular SMS messages that are displayed to a user, and to update one or more applications on the user device with the data updates. The method might further comprise sending, with the first computer, the SMS message containing the data updates to the user device over a communications network.

In some embodiments, the format that triggers the data update analyzer to intercept the SMS message might comprise a first predetermined number of bits indicating a start of a message, a second predetermined number of bits indicating whether the SMS message is encrypted, a third predetermined number of bits indicating whether the user is a registered user, fourth and fifth predetermined numbers of bits indicating a template of the SMS message, a sixth predetermined number of bits containing the data updates, seventh and eighth predetermined numbers of bits indicating bits that are reserved for future processing, ninth and tenth predetermined numbers of bits indicating whether the data updates are being sent over multiple SMS messages, eleventh and twelfth predetermined numbers of bits indicating whether the data updates are current data or archived data, and a thirteenth predetermined number of bits indicating an end of the message.

Merely by way of example, in some cases, generating the SMS message might comprise encrypting, with the first computer, the data updates and embedding, with the first computer, the encrypted data updates in the SMS message. In some instances, generating the SMS message might further comprise providing, with the first computer, a first indicator in the SMS message indicating that the data updates contained in the SMS message has been encrypted.

According to some embodiments, the method might further comprise determining, with the first computer, whether a user associated with the user device is a registered user. The method might also comprise, based on a determination that the user associated with the user is a registered user, providing, with the first computer, a second indicator in the SMS message indicating that the user device has been authenticated. The method might further comprise, based on a determination that the user associated with the user is not a registered user, providing, with the first computer, a third indicator in the SMS message indicating that the user device has not been authenticated.

In some embodiments, the method might further comprise determining, with the first computer, whether the data updates exceed character limits of one or more single SMS messages. Based on a determination that the data updates exceed character limits of one or more single SMS messages, generating the SMS message might comprise dividing, with the first computer, the data updates into two or more portions, generating, with the first computer, two or more SMS messages, and embedding, with the first computer, each of the two or more portions of the data updates into a designated one of the two or more SMS messages. In some instances, generating the SMS message might further comprise providing, with the first computer, a fourth indicator in each of the two or more SMS messages indicating that the data updates contained in each of the two or more SMS messages represent partial data updates.

The method, according to some embodiments, might further comprise determining, with the first computer, whether the data updates represent current data or archived data. The method might also comprise, based on a determination that the data updates represent current data, providing, with the first computer, a fifth indicator in the SMS message indicating that the data updates contained in the SMS message represent current data. The method might further comprise, based on a determination that the data updates represent archived data, providing, with the first computer, a sixth indicator in the SMS message indicating that the data updates contained in the SMS message represent archived data.

In some cases, the method might further comprise receiving, with the first computer, the data updates in data format from a second computer, which is separate from the first computer.

In another aspect, a method might comprise receiving, with a user device, one or more short message service ("SMS") messages containing data updates, and determining, with the user device, that the one or more SMS messages each have a format indicating data updates are present rather than a regular SMS message that are displayed to a user. The method might also comprise, based on such determination, diverting, with the user device, the one or more SMS messages from a queue of regular SMS messages that are displayed to the user, and extracting, with the user device, the data updates from each of the one or more SMS messages. The method might further comprise translating, with the user device, the data updates into a single data update file in data format, and relaying, with the user device, the single data update file in data format to one or more applications running on the user device, to update the one or more applications.

Merely by way of example, in some cases, the format indicating data updates are present might comprise a first predetermined number of bits indicating a start of a message, a second predetermined number of bits indicating whether the SMS message is encrypted, a third predetermined number of bits indicating whether the user is a registered user, fourth and fifth predetermined numbers of bits indicating a template of the SMS message, a sixth predetermined number of bits containing the data updates, seventh and eighth predetermined numbers of bits indicating bits that are reserved for future processing, ninth and tenth predetermined numbers of bits indicating whether the data updates are being sent over multiple SMS messages, eleventh and twelfth predetermined numbers of bits indicating whether the data updates are current data or archived data, and a thirteenth predetermined number of bits indicating an end of the message.

In some embodiments, the method might further comprise determining, with the user device, whether the data updates have been encrypted. Based on a determination that the data updates have been encrypted, translating the data updates into a single data update file in data format might comprise decrypting, with the user device, the data updates contained in each of the one or more SMS messages and translating, with the user device, the decrypted data updates into the single data update file in data format.

According to some embodiments, the method might further comprise updating, with the user device, one or more applications running on the user device, using the data updates in the single data update file. Merely by way of example, in some instances, based on a determination that the data updates comprise at least one of web-based user notifications or social media-based user notifications for a user associated with the user device, the method might further comprise displaying, with the user device and on a display device of the user device, the at least one of web-based user notifications or social media-based user notifications for the user, via at least one application of the one or more applications running on the user device, regardless of whether the user device is in a data-not-available ("DNA") zone.

In yet another aspect, a system might comprise a first computer and a user device. The first computer might comprise at least one first processor and a first non-transitory computer readable medium in communication with the at least one first processor. The first non-transitory computer readable medium might have stored thereon computer software comprising a first set of instructions that, when executed by the at least one first processor, causes the first computer to perform one or more functions. The first set of instructions might comprise instructions for generating one or more short message service ("SMS") messages containing data updates. The one or more SMS messages might each have a format that triggers a data update analyzer in a user device to intercept the one or more SMS messages and to divert the one or more SMS messages from a queue of regular SMS messages for display to a user. The first set of instructions might further comprise instructions for sending the one or more SMS messages containing the data updates to the user devices over a communications network.

The user device might comprise at least one second processor and a second non-transitory computer readable medium in communication with the at least one second processor. The second non-transitory computer readable medium might have stored thereon computer software comprising a second set of instructions that, when executed by the at least one second processor, causes the user device to perform one or more functions. The second set of instructions might comprise instructions for receiving the one or more SMS messages containing data updates, instructions for determining that the one or more SMS messages each have a format indicating data updates are present rather than a regular SMS message for display to a user, and instructions for, based on such determination, diverting the one or more SMS messages from a queue of regular SMS messages for display to the user. The second set of instructions might further comprise instructions for extracting the data updates from each of the one or more SMS messages, instructions for translating the data updates into a single data update file in data format, and instructions for relaying, with the user device, the single data update file in data format to one or more applications running on the user device.

In still another aspect, an apparatus might comprise at least one processor and a non-transitory computer readable medium in communication with the at least one processor. The non-transitory computer readable medium might have stored thereon computer software comprising a set of instructions that, when executed by the at least one processor, causes the apparatus to perform one or more functions. The set of instructions might comprise instructions for generating one or more short message service ("SMS") messages containing data updates. The one or more SMS messages might each have a format that triggers a data update analyzer in a user device to intercept the one or more SMS messages and to divert the one or more SMS messages from a queue of regular SMS messages for display to a user. The set of instructions might further comprise instructions for sending the one or more SMS messages containing the data updates to the user devices over a communications network.

According to some embodiments, the set of instructions might further comprise instructions for determining that at least one SMS message of the one or more SMS messages containing the data updates has not been received by the user device. In some cases, the set of instructions might further comprise instructions for, based on a determination that at least one SMS message of the one or more SMS messages containing the data updates has not been received by the user device, resending the at least one SMS message to the user device over the communications network on a periodic basis until it has been determined that the at least one SMS message has been received by the user device.

In some embodiments, the set of instructions might further comprise instructions for determining that the user device has entered a data-not-available ("DNA") zone while at least one SMS message of the one or more SMS messages containing the data updates is being sent to the user device. In some instances, the set of instructions might further comprise instructions for, based on a determination that the user device has entered a DNA zone while at least one SMS message of the one or more SMS messages containing the data updates is being sent to the user device, resending the at least one SMS message to the user device over the communications network on a periodic basis until it has been determined that the at least one SMS message has been received by the user device Merely by way of example, in some cases, the set of instructions might further comprise instructions for determining that the user device is offline while at least one SMS message of the one or more SMS messages containing the data updates is being sent to the user device. In some cases, the set of instructions might further comprise instructions for, based on a determination that the user device is offline while at least one SMS message of the one or more SMS messages containing the data updates is being sent to the user device, resending the at least one SMS message to the user device over the communications network on a periodic basis until it has been determined that the at least one SMS message has been received by the user device. In some embodiments, the computer might be one of a server computer or a cloud-based server.

In another aspect, a user device might comprise at least one processor and a non-transitory computer readable medium in communication with the at least one processor. The non-transitory computer readable medium might have stored thereon computer software comprising a set of instructions that, when executed by the at least one processor, causes the user device to perform one or more functions. The set of instructions might comprise instructions for receiving one or more short message service ("SMS") messages containing data updates. The one or more SMS messages might each have a format that triggers a data update analyzer in a user device to intercept the one or more SMS messages and to divert the one or more SMS messages from a queue of regular SMS messages for display to a user. The set of instructions might also comprise instructions for determining that the one or more SMS messages each have a format indicating data updates are present rather than a regular SMS message for display to a user and instructions for, based on such determination, diverting the one or more SMS messages from a queue of regular SMS messages for display to the user. The set of instructions might further comprise instructions for extracting the data updates from each of the one or more SMS messages, instructions for translating the data updates into a single data update file in data format, and instructions for relaying, with the user device, the single data update file in data format to one or more applications running on the user device.

In yet another aspect, a method might comprise generating, with a first computer, data updates in a linear messaging format. The linear messaging format might have a format that triggers a data update analyzer in a user device to intercept the data updates, and to update one or more applications on the user device with the data updates. The method might further comprise sending, with the first computer, the data updates in the linear messaging format to the user device over a linear messaging communications network.

In some embodiments, the data updates might comprise at least one of application updates, media content updates, service updates, web-based user notifications, or social media-based user notifications. Merely by way of example, in some cases, generating, with the first computer, data updates in a linear messaging format might comprise generating, with the first computer, one or more short message service ("SMS") messages containing the data updates. The one or more SMS messages might each have a format that triggers the data update analyzer in the user device to intercept the one or more SMS messages, to divert the one or more SMS messages from the queue of regular SMS messages that are displayed to the user, and to update the one or more applications on the user device with the data updates.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-9 illustrate some of the features of the method, system, and apparatus for implementing message-driven data updates that, in some cases, utilizes protocols for data transmission through short message service ("SMS") messaging, as referred to above. The methods, systems, and apparatuses illustrated by FIGS. 1-9 refer to examples of different embodiments that include various components and steps, which can be considered alternatives or which can be used in conjunction with one another in the various embodiments. The description of the illustrated methods, systems, and apparatuses shown in FIGS. 1-9 is provided for purposes of illustration and should not be considered to limit the scope of the different embodiments.

With reference to the figures, FIG. 1 is a schematic diagram illustrating a system 100 for implementing message-driven data updates, in accordance with various embodiments. The embodiments as represented in FIG. 1 are merely illustrative and are not intended to limit the scope of the various embodiments.

In the embodiment of FIG. 1, system 100 might comprise one or more computing systems 105 and one or more user devices 110. The one or more computing systems 105 might each include, but is not limited to, a server computer 105a, a mobile switching center ("MSC") 105b, and/or the like. The one or more user devices 110 might each include, without limitation, a tablet computer 110a, a smart phone 110b, a mobile phone 110c, a portable gaming device 110d, a navigation device 110e, a database 110f, a server computer 110g, a desktop computer 110h, a laptop computer 110i, or any other suitable user device 105j, and the like. At least one computing system 105 of the one or more computing systems 105 might communicatively couple with at least one user device 110 of the one or more user devices 110 via one or more networks 115, and, in some cases, via one or more telecommunications relay systems 120.

The one or more networks 115 might each include any suitable network, including, but not limited to, a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; or any combination of these and/or other networks. The one or more telecommunications relay systems 120 might include, without limitation, one or more wireless network interfaces (e.g., wireless modems, wireless access points, and the like), one or more towers, one or more satellites, and/or the like.

According to some embodiments, system 100 might further comprise one or more databases 125 that are each communicatively coupled with the at least one computing system 105. For instance, as shown in the non-limiting example of FIG. 1, database 125a might communicatively couple with server computer 105a, while database 125b might communicatively couple with MSC 105b, or the like.

Merely by way of example, in some embodiments, system 100 might further comprise one or more service providers 130, including, without limitation, a first service provider 130a, a second service provider 130b, through an $N^{th}$ service provider 130n. Each service provider 130 might be associated with an application server(s) 135 that is communicatively coupled to a database 140. For instance, the first service provider 130a might be associated with first application server 135a and database 140a that is communicatively coupled therewith, while the second service provider 130b might be associated with second application server 135b and database 140b that is communicatively coupled therewith, and the $N^{th}$ service provider 130n might be associated with $N^{th}$ application server 135n and database 140n that is communicatively coupled therewith. Each of the first through $N^{th}$ application servers 135a-135n (as well as the databases 140a-140n) might be communicatively coupled with the at least one computing system 105 and/or the at least one user device 110 via the network(s) 115 (and, in some cases, via the one or more telecommunications relay systems 120).

In operation, in accordance with some embodiments, the computing system 105 might receive data updates in a data format from an application server 135, the data updates being intended to update one or more applications running on one or more user devices 110. The computing system 105 might generate data updates in a linear messaging format (e.g., in a SMS message format), based at least in part on the received data updates in data format, in some cases by translating the data updates in data format into data updates in the linear messaging (e.g., SMS) format. The computing system 105 might subsequently send the data updates in linear messaging format to at least one user device 110 via the network 115 (and, in some cases, via the one or more telecommunications relay systems 120).

In some instances, the data updates might be encrypted or secured, and an indicator might be included in the linear message in which the data update is embedded indicating that the data updates are encrypted. In some embodiments, the computing system might determine whether the user and/or the at least one user device 110 that is associated with the user (in some cases, based on a device identification, including, but not limited to, a telephone number, a MAC address, a device ID code, a serial number, an e-mail address, etc.) might be authorized to receive the data updates and/or whether the user associated with the user device is a registered user. If determined to be authorized or registered, an indicator might be included in the in the linear message in which the data update is embedded indicating that the user and/or the user device has been authenticated. In some cases, a template of the data message frame that makes up the linear message in which the data update is embedded might be identified in an indicator that is included in said linear message.

According to some embodiments, the computing system might determine whether the data update exceeds character limits of one or more single linear (e.g., SMS) messages. If the data update is determined to exceed character limits of single linear messages, the computing system might divide the data update into two or more portions, might generate two or more linear (e.g., SMS) messages, and might embed, each of the two or more portions of the data update into a designated one of the two or more linear messages. In some cases, an indicator might be included in each of the two or more linear messages indicating that the data update contained in each of the two or more linear (e.g., SMS) messages represent partial data update. In alternative cases, all but the last linear message might indicate partial data update, while the last linear message might indicate that the data update is now complete (after the last linear message is sent and received).

In some embodiments, the computing system might determine whether the data updates represent current data or old (i.e., archived) data. If the data is determined to be current, an indicator might be included in the linear message in which the data update is embedded indicating that the data updates are current. If the data is determined to be archived or old, an indicator might be included in the linear message in which the data update is embedded indicating that the data updates are archived or old. In a similar manner, if it is determined that there is no data or if the data is junk data, an indicator might be included in the linear message in which the data update is embedded indicating that the data updates represent no data or junk data.

According to some embodiments, the translated data updates might be embedded within the data portion of a data message frame that makes up the linear message. For an SMS message, the data message frame (as described in detail in FIGS. 2A-2I below) might be 160 characters long. However, when data blocks—i.e., data blocks for indicating whether the data update is secure, whether the user or user device is authenticated, what template the data message frame is using or is arranged in, reserved indicators (i.e., indicators that might be configured at a later time for as-yet unspecified functionalities or states), what condition the data update are in (i.e., whether complete or partial), what status the data update has (i.e., whether the data update is current or old), and/or the like—are taken into account, the data portion in which the data update is embedded might be about 150 characters long.

Because SMS messages may be sent and received regardless of whether a user device is in a network data available zone, data or data updates may continue to be sent to the user device to update applications running thereon, regardless of whether the user device is in a "data-not-available" ("DNA") zone.

FIGS. 2A-2I (collectively, "FIG. 2") is a block diagram illustrating various embodiments of a message data framework 200 that may be used when implementing message-driven data updates. The embodiments as represented in FIG. 2 are merely illustrative and are not intended to limit the scope of the various embodiments.

With reference to the embodiment of FIG. 2A, data message frame 200 might comprise a plurality of data blocks 205, each comprising a predetermined number of bits of data that may be the same or different from other data blocks 205. In some embodiments, the plurality of data blocks 205 might comprise a first data block 205a, a second data block 205b, a third data block 205c, a fourth data block 205d, a fifth data block 205e, a sixth data block 205f, a seventh data block 205g, an eighth data block 205h, a ninth data block 205i, a tenth data block 205j, an eleventh data block 205k, a twelfth data block 205l, and a thirteenth data block 205m, or the like.

According to some embodiments, the first and thirteenth data blocks 205a and 205m might be associated with "start" and "end" data blocks, respectively, indicating the start and end of a data update or message data in linear messaging format. The "start" data block might include a "start" indicator, which in some instances might comprise a "#" symbol (sometimes referred to as a "hashtag" or "hash" mark, as a "pound sign," or as a "number sign"), or the like. The "end" data block might include an "end" indicator, which in some cases might comprise a "$" symbol (sometimes referred to as a "dollar" sign), or the like.

The second and third data blocks 205b and 205c might be associated with "security" and "authentication" data blocks, respectively indicating whether or not the data update or message data is secure or encrypted and whether or not the user and/or user device is authenticated. For example, an indicator "S" provided in the second (or "security") data block 205b might indicate that the data or data updates are secure or encrypted, while an indicator "X" provided in the same data block (i.e., the second (or "security") data block 205b) might indicate that the data or data updates are neither secure nor encrypted. In a similar manner, an indicator "A" provided in the third (or "authentication") data block 205c might indicate that the user and/or user device are registered and/or have been authenticated, while an indicator "X" provided in the same data block (i.e., the third (or "authentication") data block 205c) might indicate that the user and/or user device are neither registered nor have been authenticated.

With reference to FIG. 2B, as shown in security and authentication ("S&A") data blocks 210a, an authenticated user/user device with unencrypted data or data updates might have indicators "X" and "A" in the second and third data blocks 205b and 205c, respectively. As shown in S&A data blocks 210b, a non-registered or non-authenticated user/user device with encrypted data or data updates might have indicators "S" and "X" in the second and third data blocks 205b and 205c, respectively. As shown in S&A data blocks 210c, an authenticated user/user device with encrypted data or data updates might have indicators "S" and "A" in the second and third data blocks 205b and 205c, respectively. And, as shown in S&A data blocks 210d, a non-registered or non-authenticated user/user device with unencrypted data or data updates might have indicators "X" and "X" in the second and third data blocks 205b and 205c, respectively.

In some cases, the fourth and fifth data blocks 205d and 205e might be associated with "template" data blocks, indicating what message template or message format the data message frame 200 is currently using. Referring to FIG.

2C, in some embodiments, the fourth data block 205d might include an indicator "T" while the fifth data block 205e might have a numerical indicator between "1" and "9" (as shown in "template" data blocks 215a-215n). The default template might be "T1" (as shown in "template" data blocks 215a), with the particular order of data blocks 205a-205m as shown in FIG. 2A. Other templates might have different order in terms of data blocks. For example, in template "T2" (as shown in "template" data blocks 215b), the data portion 205f might be split into two, with the first half positioned between the "start" data block 205a and the "security" data block 205b, and the second half positioned between the "authentication" data block 205c and the "template" data block 205d. The "T" followed by a single-digit numeral allows for easy identification of the "template" data blocks (assuming that the data portion does not or is not likely to contain an upper-case "T" followed by a single-digit numeral).

The sixth data block 205f, in some embodiments, might represent a data block containing the data, which might be embodied as a data update, a message, and/or the like. The data, according to some embodiments, might include, but is not limited to, a set of alphabetic characters in upper and/or lower case (i.e., "a-z" and/or "A-Z"), a set of numbers, a set of special characters (e.g., "_"; "!"; "@"; "%"; "^"; "&"; "*"; "("; ")"; "+"; "-"; "/"; "."; "?"; "~"; "`"; "="; and/or the like), or a combination of these. In some instances, the alphabetic characters might also, or alternatively, include, without limitation, International Organization for Standardization ("ISO"), Latin, ("ANSI"), ("GSM"), ("USC"), Chinese, Unicode, Binary, Hexadecimal characters, and/or the like.

For an SMS message, the data message frame (as shown in FIG. 2A) might be 160 characters long. However, as shown in FIG. 2D, when data blocks—i.e., data blocks for indicating whether the data update is secure, whether the user or user device is authenticated, what template the data message frame is using or is arranged in, reserved indicators (i.e., indicators that might be configured at a later time for as-yet unspecified functionalities or states), what condition the data update are in (i.e., whether complete or partial), what status the data update has (i.e., whether the data update is current or old), and/or the like—are taken into account, the data portion in which the data update is embedded might be about 150 characters long. If the data or data updates being delivered are less than 150 characters, empty place holders (in some embodiments, underscore or "_") are used to fill the rest of the data portion—i.e., so as to fill the 150 character space with the data or data updates and the "_" or underscore characters.

According to some embodiments, the seventh and eighth data blocks 205g and 205h might be reserved for as-yet unspecified functionalities or states, future enhancement, future operations, and/or the like. At present, the "reserved" data blocks might include indicators such as "_" or the like. In some cases, the "reserved" data blocks, as a future enhancement or the like, might be used to signal presence priority data or data updates. For example, if indicators including, but not limited to, "!!" or the like are included in the seventh and eighth data blocks 205g and 205h, it may be determined that the data or data updates contained in the linear message are priority data or data updates. In such a case, the priority data or data updates may be put in queue for translation and relay to applications ahead of other data or data updates (which might have been received before the priority data or data updates were received).

In some embodiments, the ninth and tenth data blocks 205i and 205j might be associated with "condition" data blocks, indicating whether the data or data updates have been received completely or partially, or whether the data or data updates represent empty data. In some cases, "no data-MDF" might invoke a request message back to a server or computing system (e.g., computing system 105). With reference to FIG. 2E, as shown in "condition" data blocks 205i and 205j, an indicator "C" might indicate a complete set of data or data updates, while an indicator "P" might indicate a partial set of data or data updates. For example, as shown in "condition" data blocks 220a, a complete set of data or data updates (whether individually complete (i.e., single linear message data or data updates) or a last of linear message of a group of multi-message data or data updates) might have indicators "C" and "X" in the ninth and tenth data blocks 205i and 205j, respectively. As shown in "condition" data blocks 220b, a partial set of data or data updates (i.e., indicating data or data updates spanning two or more linear messages) might have indicators "X" and "P" in the ninth and tenth data blocks 205i and 205j, respectively. As shown in "condition" data blocks 220c, a "no data" or "empty data" MDF or linear message might have indicators "X" and "X" in the ninth and tenth data blocks 205i and 205j, respectively.

In some instances, the eleventh and twelfth data blocks 205k and 205l might be associated with "status" data blocks, indicating whether the data or data updates are current or old (i.e., archived) data. With reference to FIG. 2F, as shown in "status" data blocks 205k and 205l, an indicator "L" might indicate current data or data updates, while an indicator "Z" might indicate old (or archived) data or data updates. For example, as shown in "status" data blocks 225a, current data or data updates might have indicators "L" and "X" in the eleventh and twelfth data blocks 205k and 205l, respectively. As shown in "status" data blocks 225b, old (or archived) data or data updates might have indicators "X" and "Z" in the eleventh and twelfth data blocks 205k and 205l, respectively. As shown in "status" data blocks 225c, a "no data" or "junk data" MDF or linear message might have indicators "X" and "X" in the eleventh and twelfth data blocks 205k and 205l, respectively.

Figure 2G:
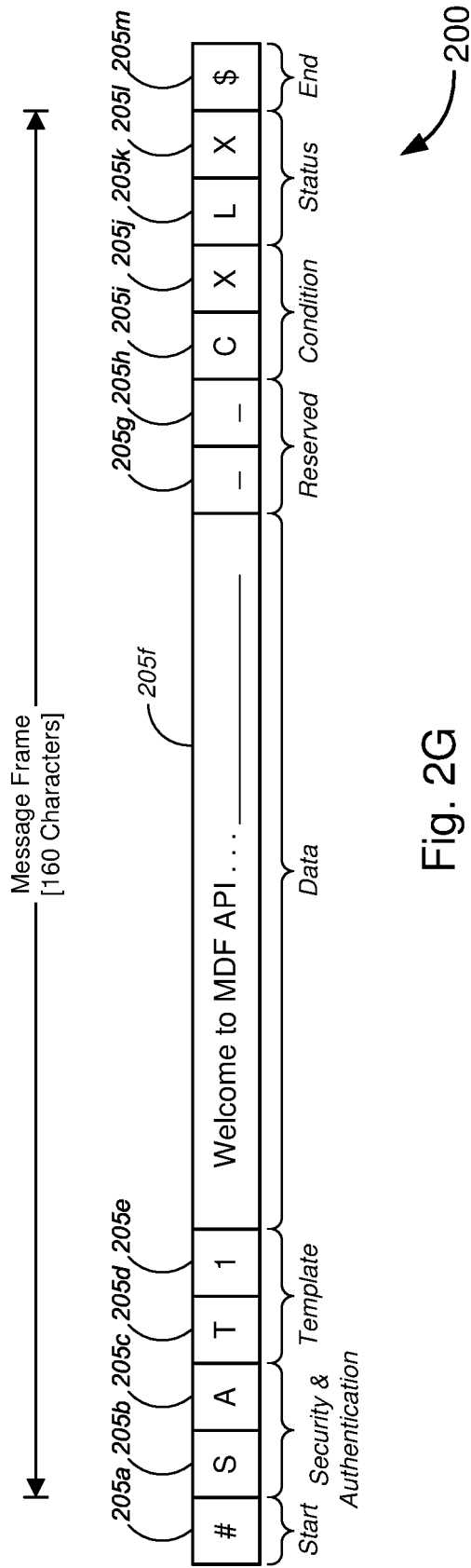
Figure 2H:
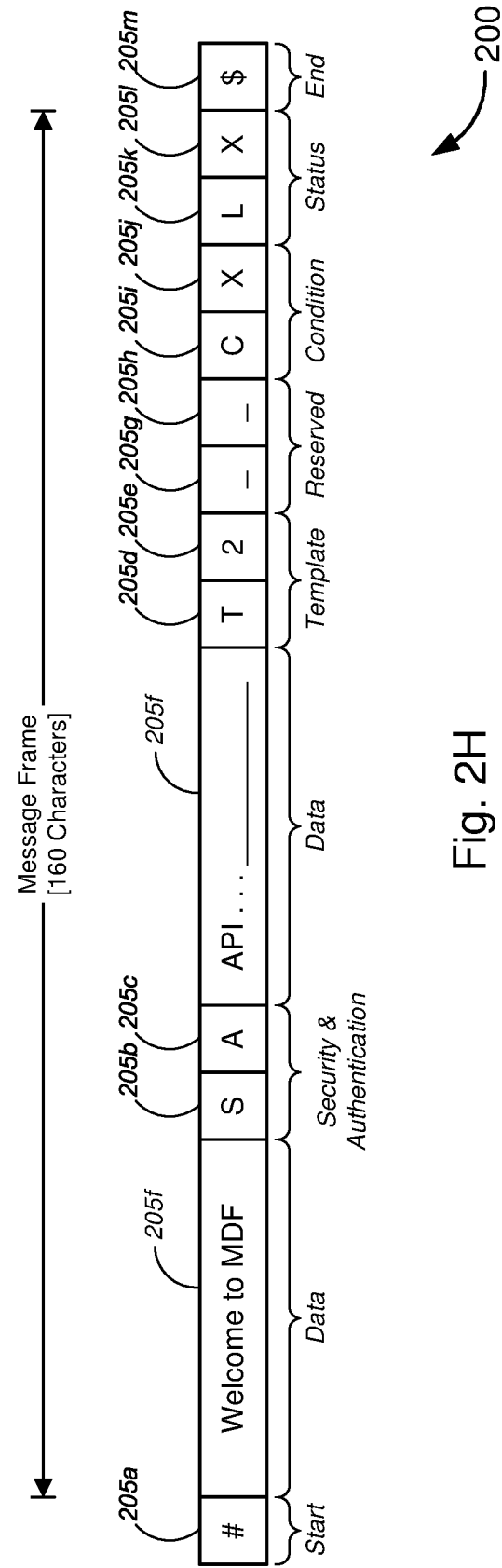
Figure 2I:
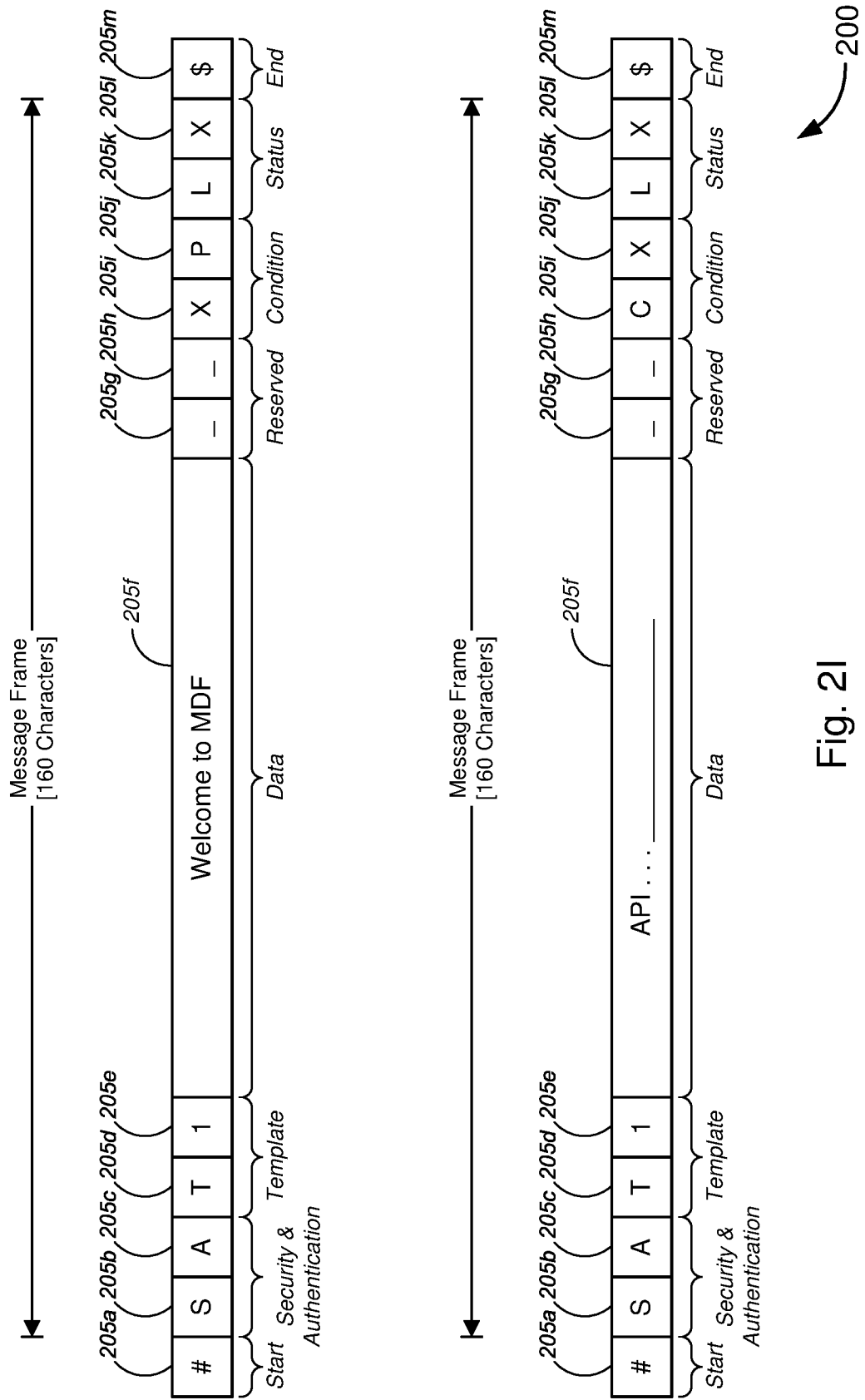

FIGS. 2G-2I depict example MDFs, in accordance with various embodiments. For example, with reference to FIG. 2G, an encrypted data or data update with a registered or authenticated user or user device, using the default template (i.e., template "T1"), that is complete and current, and that has data containing the string "Welcome to MDF API . . . ," might have an MDF 200 that contains the following: "# SAT1Welcome_to_MDF_API_. . . _____CXLX$." Turning to FIG. 2H, an MDF 200, which is structured using template "T2," as mentioned above, but is otherwise identical to the MDF of FIG. 2G, might contain the following: "# Welcome_to_MDF_SAAPI_. . . T1_CXLX$." For multi-message data, as shown in FIG. 2I, an MDF 200, that is otherwise identical to the MDF of FIG. 2G, might contain the following two messages, for example: "# SAT1Welcome_to_MDF_____XPLX$" and "# SAT1API_. . . _____CXLX$." Although FIGS. 2G-2I depict a string "Welcome to MDF API . . . ," the various embodiments are not so limited, and the data portion 205f of the one or more linear messages might contain any suitable data, message, or data update, and the like.

Figure 3A:
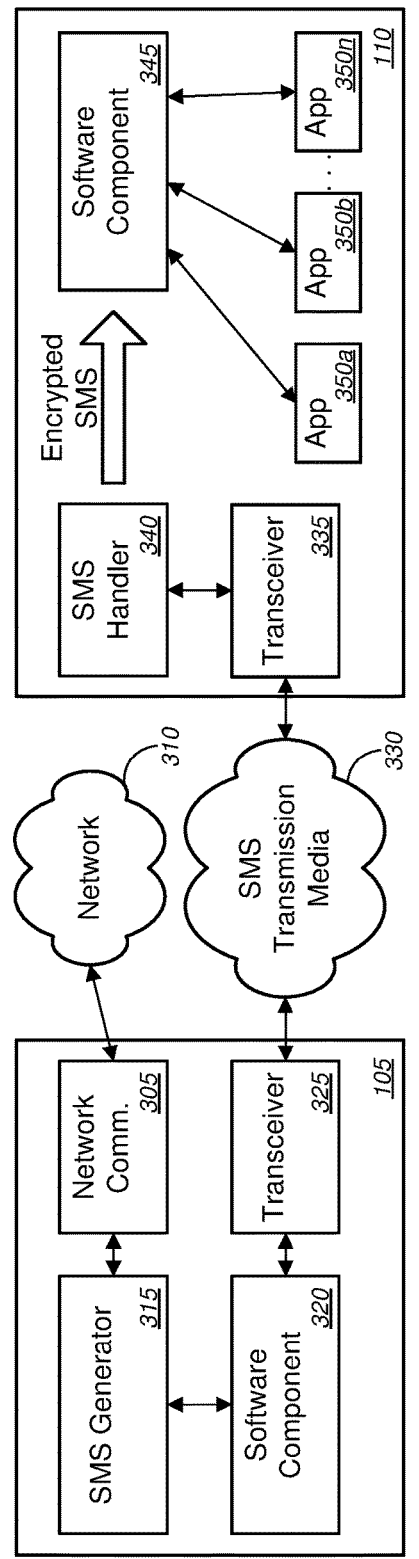
FIGS. 3A and 3B are schematic diagrams illustrating another system for implementing message-driven data updates, in accordance with various embodiments.
Figure 3B:
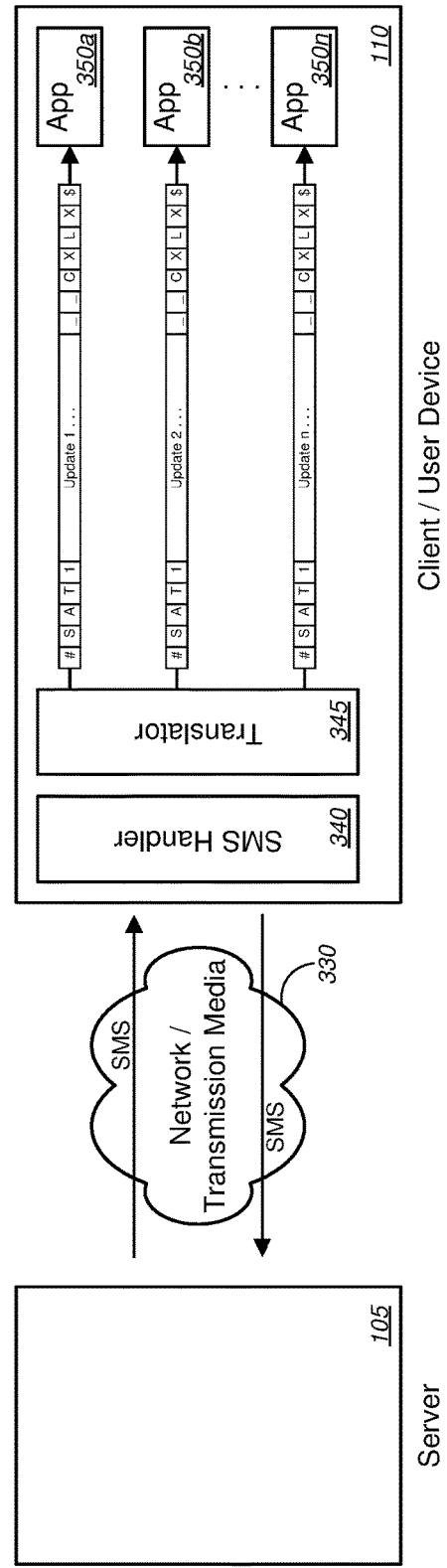

FIGS. 3A and 3B (collectively, "FIG. 3") are schematic diagrams illustrating another system 300 for implementing message-driven data updates, in accordance with various embodiments. The embodiments as represented in FIG. 3 are merely illustrative and are not intended to limit the scope of the various embodiments.

In the embodiment of FIG. 3A, system 300 might comprise server 105, user device 110, network 310, and SMS transmission media 330. Server 105 might include, without limitation, network communications device 305, a SMS generator 315, a software component 320, a transceiver 325, and/or the like. The user device 110 might include, but is not limited to, a transceiver 335, a SMS handler 340, a software component 345, one or more applications 350a-350n (collectively, "applications 350"), and/or the like.

In operation, according to some embodiments, the network communications device 305 might receive, via network 310, data or data updates in data format. SMS generator 315 might generate one or more SMS messages. The software component 320 might encrypt the data or data messages. One of the SMS generator 315 or the software component 320 might embed the (encrypted) data or data updates in the one or more SMS messages. The transceiver 325 might send the one or more SMS messages (containing the data or data updates)—i.e., might send the data or data updates in linear messaging (in this case, SMS) format—to transceiver 335 of user device 110 via SMS transmission media 330.

Transceiver 335 might receive the one or more SMS messages (containing the data or data updates)—i.e., might receive the data or data updates in linear messaging (in this case, SMS) format. The SMS handler 340 (which in some cases might be referred to as a "data update analyzer" or the like) might scan the incoming or received SMS messages to identify, based on indicators therein or lack thereof, data or data updates in SMS format as opposed to message-only SMS (i.e., regular SMS messages). The regular SMS messages are directed to SMS applications that allow the user to view the SMS messages, while the data or data updates in SMS format are diverted to the software component 345. The software component 345 might locate the encrypted data or data updates in the SMS message (based, e.g., on the template indicators in the template data blocks), and might decrypt the data or data updates. In some embodiments, the SMS handler 340 might pass along the data or data updates in SMS format only if the authentication data block indicates that either the user is a registered user and/or the user device 110 is a registered device. The software component 345 might decrypt data or data updates if and only if the security and authentication data blocks indicate that the data or data updates are encrypted and that the user is a registered user and/or the user device 110 is a registered device.

If it is determined based on the condition data blocks (by at least one of SMS handler 340 or software component 345) that the data or data updates represent partial data or data updates, the software component 345 might compile or stitch together the decrypted portions of data or data updates from two or more SMS messages to form a single, complete set of data or data updates. For single message data or data updates, no compiling or stitching is required, as the data or data updates contained therein already represent a single, complete set of data or data updates. The software component 345 might then determine which one or more applications 350 should receive the data or data updates, and might send to the appropriate application(s) 350 the single, complete set of data or data updates. According to some embodiments, the software component 345 might send the single, complete set of data or data updates to the identified appropriate application(s) 350 if and only if the status data blocks indicate that the data or data updates represent current data or data updates. In some cases, archived data or data updates might only be sent to particular applications 350 only if requested by the particular applications 350.

FIG. 3B depicts a different view of the system 300 above. In the embodiment of FIG. 3B, server (which might be a LAN server, a network server, a cloud server, or the like) might send or receive SMS messages via network/transmission media 330. The SMS messages might include message-only SMS messages, data or data updates in SMS format, or a combination of these. The SMS handler 340 might sort through the SMS messages, and might pass along data or data updates in SMS format to a translator 345 (which might have functionality similar to, if not identical to, that of software component 345, as described in detail above), and might forward the data or data updates to appropriate one(s) of the applications 350. Although not shown in FIG. 3, in some embodiments, for two-way transmission of SMS messages containing data or data updates, the server 105 and the user device 110 might have similar or identical sets of SMS generators/SMS handlers, software components, etc. for generating, encrypting, and/or embedding (and in some cases, dividing into multiple SMS messages) data or data updates in SMS messages as well as for handling, sorting, diverting, extracting, decrypting, and/or relaying (and in some cases, combining from multiple SMS messages) data or data updates from the SMS messages to applications running on user devices or to application servers, or the like.

As described above, because SMS messages may be sent and received regardless of whether a user device is in a network data available zone, data or data updates may continue to be sent to the user device to update applications running thereon, regardless of whether the user device is in a "data-not-available" ("DNA") zone.

Figure 4:
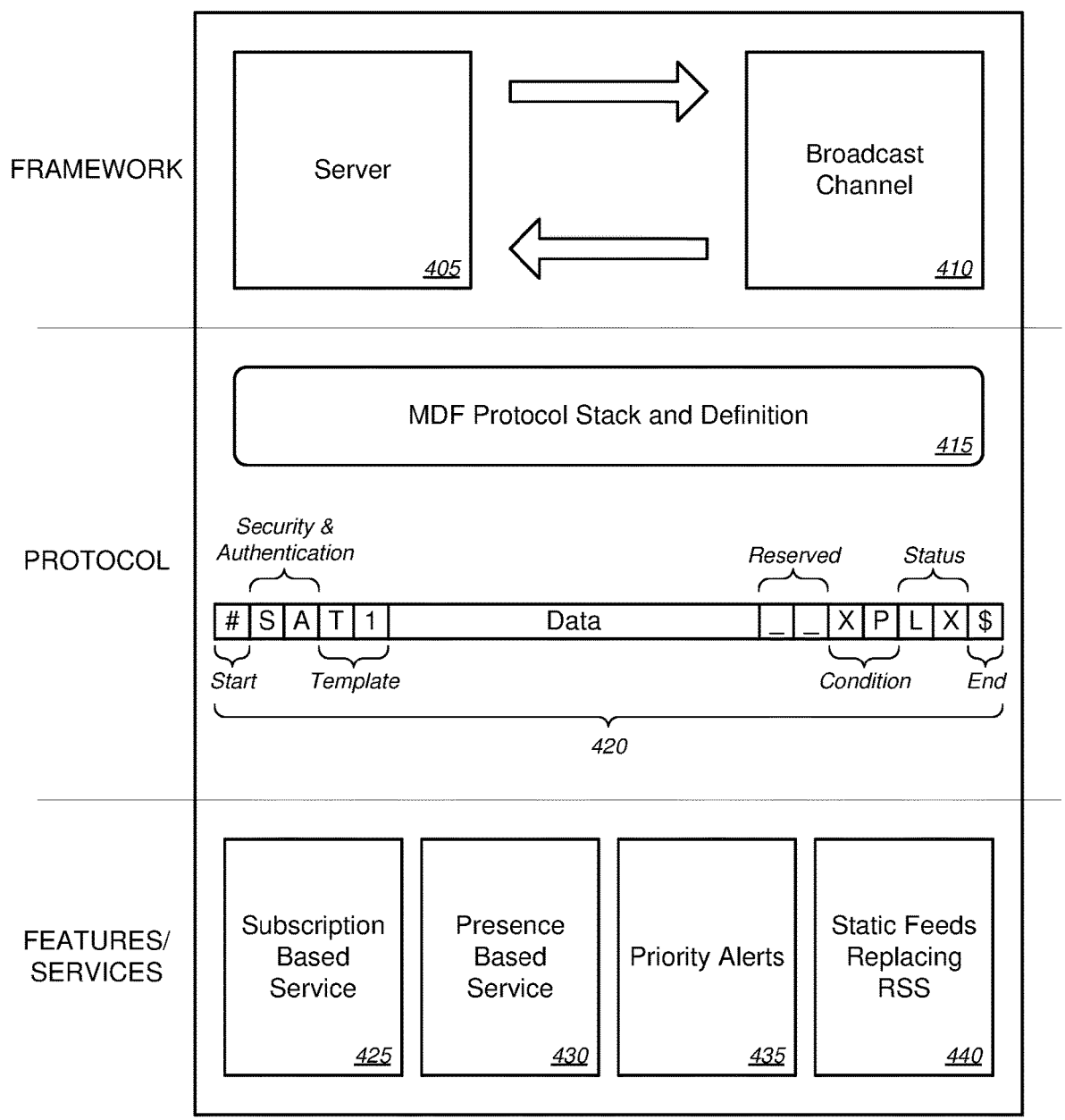
FIG. 4 is a schematic diagram illustrating yet another system for implementing message-driven data updates, in accordance with various embodiments.

FIG. 4 is a schematic diagram illustrating yet another system 400 for implementing message-driven data updates, in accordance with various embodiments. The embodiments as represented in FIG. 4 are merely illustrative and are not intended to limit the scope of the various embodiments.

In the embodiment of FIG. 4, system 400 might comprise a framework portion, a protocol portion, and a features or services portion. According to some embodiments, the framework portion might refer to an architecture that might handle the entire (or at least a substantial portion of) the MDF process, and might use existing elements as well as introducing unique aspects specific to MDF. At the heart of MDF is the protocol portion being developed and implemented. The protocol portion (the MDF structure of which is as described in detail with respect to FIG. 2) details the parameters and constructs that are needed at run time and/or at execution. The features or services portion might refer to features or services that use MDF to deliver value added features or services.

In the framework portion, a server 405 might communicate with a broadcast channel 410, and might exchange data or data updates. The server 405 might utilize MDF protocol stack and definition 415 to translate data or data updates in data format (received from the broadcast channel 410) into data or data updates in linear messaging format (e.g., SMS format), which might have the structure of MDF 420 (various embodiments of which are described in detail above with respect to FIG. 2), for updating applications running on a user device (e.g., user device 110 as shown in FIGS. 1 and 3). The applications might provide features or services including, but not limited to, subscription-based services 425, presence-based services 430, priority alert services 435, static feeds replacing rich site summary ("RSS") feeds 440, and/or the like. Other features or services (although not shown) might include, without limitation, override message services, social network services, and/or the like.

In some embodiments, for presence-based services, a user can get alerts and notifications on an application screen (via the MDF implementation described above) even in the absence of data network connectivity or data network availability. The alerts and notifications might correspond to options that might be associated with sale, food, ATMs, service stations, any amenities around the user, and/or the like. In some cases, for override message services, there may be several scenarios in which a user might need to be alerted and whose attention may need to be grabbed. For example, for emergency alerts, application alerts, flash news, stock data, varying ticket rates, special offers, etc., the MDF might check the special "reserved" characters for indicators, including, but not limited to, "!!" so that it parses accordingly and notifies the user on a priority basis. According to some embodiments, for social network services, social media updates on different platforms (e.g., Facebook™, LinkedIn™, Twitter™, etc.) can be displayed on the user or client device, via the MDF implementation, even in the absence of data network connectivity or data network availability. Using the MDF implementation, articles or social media updates may be posted back to websites of the platforms, even in the absence of data network connectivity or data network availability The server 405 might similarly utilize MDF protocol stack and definition 415 to translate data or data updates in linear messaging format (e.g., SMS format) (which might be received from a user device) into data or data updates in data format, for sending to an application server(s) of a service provider(s) (e.g., application server(s) 135 of FIG. 1) via broadcast channel 410.

Figure 5A:
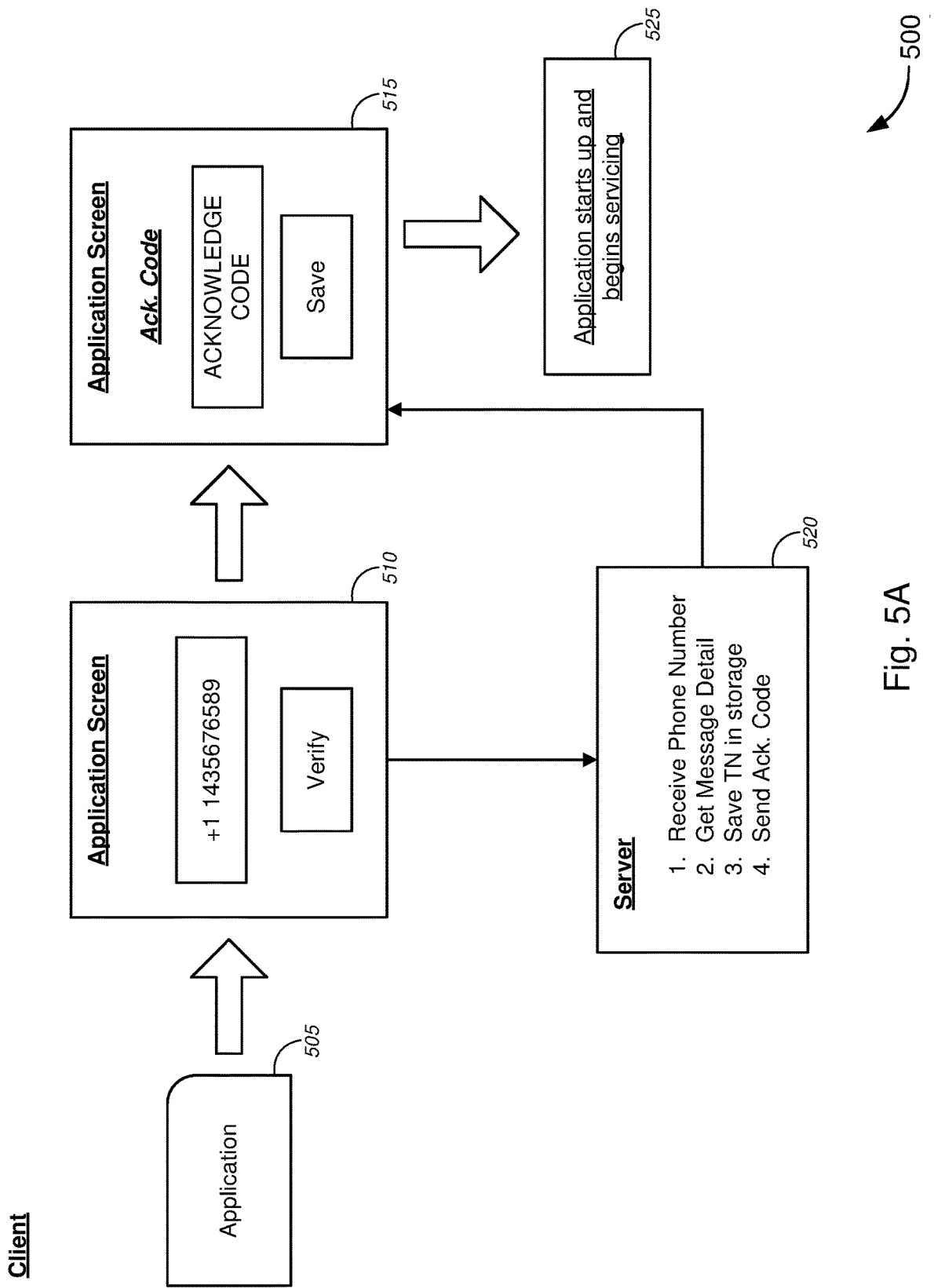
FIGS. 5A-5C are schematic diagrams illustrating process flows for implementing message-driven data updates from the perspective of a client device, a server, and an application programming interface ("API") at the client device, in accordance with various embodiments.
Figure 5B:
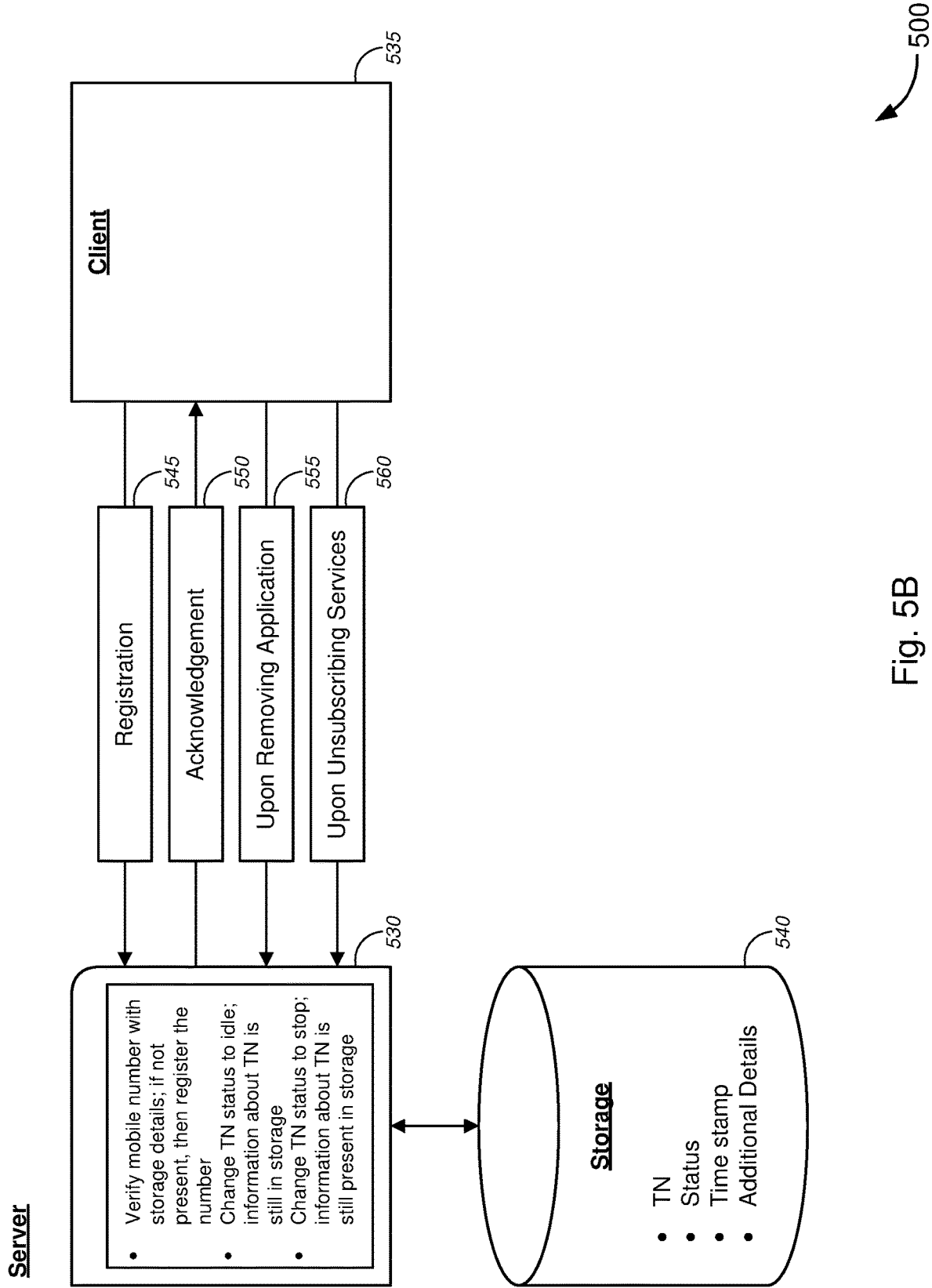
Figure 5C:
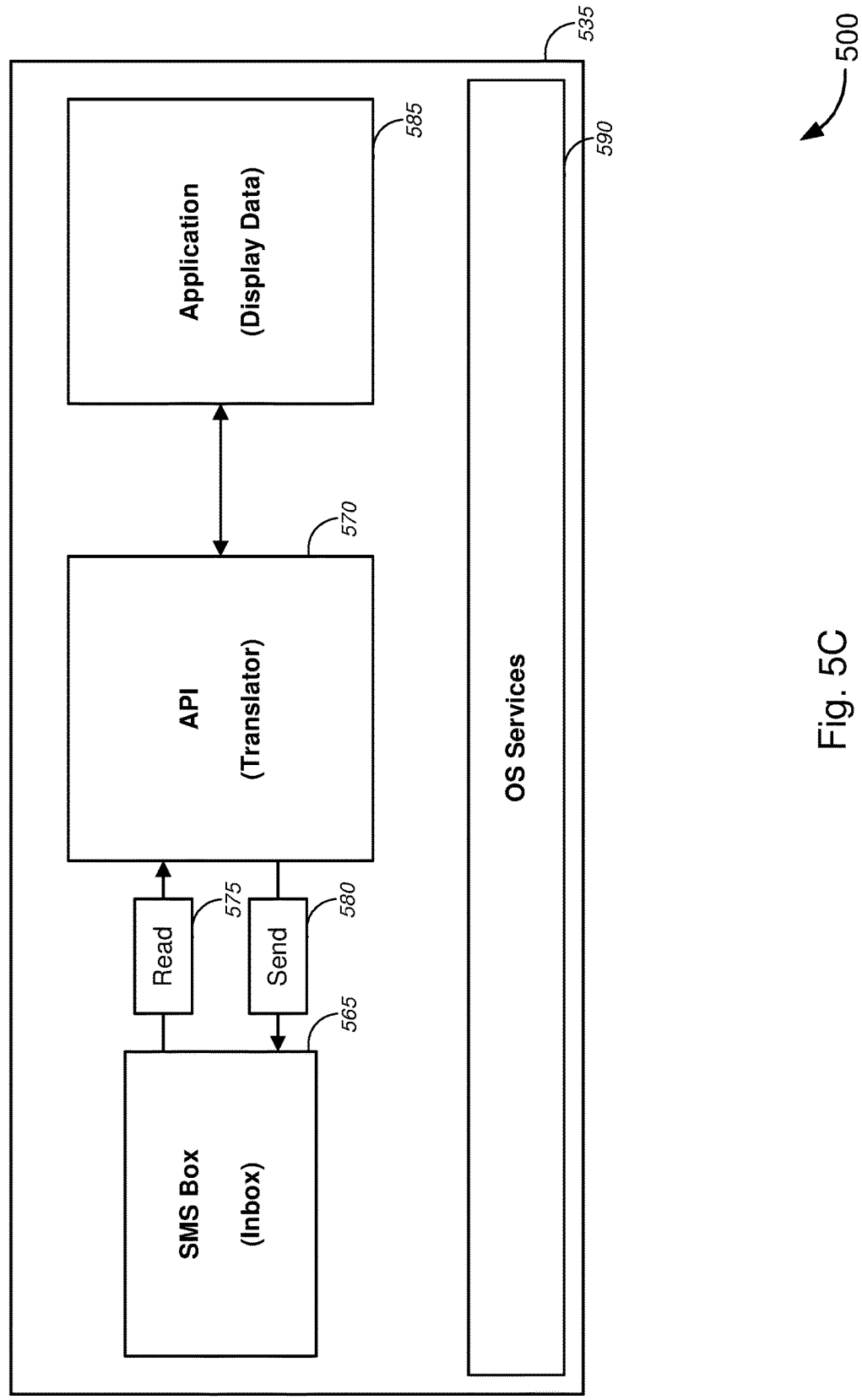

FIGS. 5A-5C (collectively, "FIG. 5") are schematic diagrams illustrating process flows 500 for implementing message-driven data updates from the perspective of a client device, a server, and an application programming interface ("API") at the client device, in accordance with various embodiments. In particular, FIG. 5 depicts installation and authentication for message data framework setup, in accordance with various embodiments. The embodiments as represented in FIG. 5 are merely illustrative and are not intended to limit the scope of the various embodiments.

With reference to FIG. 5A, from the perspective of a client device (e.g., a user device 110 of FIGS. 1 and 3), application 505 running on the client device might cause an application screen to be displayed (e.g., as a graphical user interface ("GUI") or the like) on a display screen of the client device (which might be integrated therewith (as in tablet computers, smart phones, mobile phones, portable gaming devices, laptop computers, or the like) or external to the client device (as in desktop computers, server computers, or the like). The application might utilize MDF, as described in detail above. On application screen 510, a telephone number or other identifier code associated with the user and/or the user device, along with an option (embodied as a soft button or the like) to verify the telephone number or other identifier code, might be displayed. When the user clicks on, presses, or activates the "verify" key, the telephone number or other identifier code is sent to a server 520 (e.g., server 105 or 405 in FIGS. 1, 3, and 4).

The server 520 might receive the telephone number or other identifier code, might receive message details, might save the telephone number or other identifier code in a storage device (e.g., database 125 of FIG. 1), and might send an acknowledgment code to the client device. On application screen 515, the acknowledgment code might be displayed, along with an option (embodied as a soft button or the like) to save the acknowledgment code. Thereafter, the application 505 might start up and might begin providing services associated with the application 505.

We now turn to FIG. 5B, which is shown from the perspective of the server. Applications or programs 530 running on the server 520 might receive registration information 545 (including, without limitation, mobile number or other identifier code, or the like) from client device 535, might verify the mobile number (or other identifier code, or the like) with storage details (such as information stored in storage device 540), might register the number (or other identifier code, or the like) if not already present or not already registered and might store the number (or other identifier code, or the like) in the storage device 540 (along with status information, time/date stamps, and any additional details, or the like), and might send an acknowledgment 550 to the client 535, in a manner similar, if not identical, to the process of the embodiment of FIG. 5A.

Upon removing an application 555 (e.g., after receiving, at the client device 535, a request from the user to remove the application), the server 520 might change the status of the mobile number (or other identifier code, or the like) to "idle"; information about the mobile number (or other identifier code, or the like) might still be stored in the storage device 540. Although not shown, when the same application is installed again, the client application is registered again, at which point, the server status of the mobile number (or other identifier code, or the like) might be changed from "idle" to "active." Upon unsubscribing services 560 (e.g., after receiving, at the client device 535, a request from the user to unsubscribe services), the server 520 might change the status of the mobile number (or other identifier code, or the like) to "stop"; information about the mobile number (or other identifier code, or the like) might still be stored in the storage device 540.

Referring to the embodiment of FIG. 5C, which is shown from the perspective of an API running within the client device 535, an SMS box (in some cases, an "inbox") might send data or data updates in SMS format to API (or translator) 570 (which might correspond to translator or software component 345 of FIG. 3), which might read (during process 575) the data or data updates in SMS format, might translate the data or data updates in SMS format into data or data updates in a single, complete set of data or data updates in data format, and might relay the single, complete set of data or data updates in data format to an appropriate application(s) 585. In some cases, the application 585 might display data or other interface elements on a display device of the client device as part of the services being offered by running of the application 585 (in some instances, in response to receiving the data or data updates; in other instances, as a normal course of operation for the application 585).

According to some embodiments, the application 585 might itself send data or data update information (e.g., request for data or data updates, tracking information, identifier information, reports, etc.) to an application server(s) associated with a service provider(s) (e.g., application server(s) 135 of FIG. 1). The API 570 might receive the data or data update information (which would be in data format) from the application 585, might translate the data or data update information in data format to data or data update information in SMS format (in some cases, by dividing the data or data update information into two or more portions and embedding the two or more portions into designated ones of two or more SMS messages), and might send the data or data update information (during process 580) to the SMS Box 565 (in this case, an "outbox" or "sent box") for sending to the application server(s). The client device 535 might, in some embodiments, also have operating system ("OS") services running in conjunction with, or independent from, the application 585, to provide OS type services.

Although not specifically described with reference to FIG. 5, the API 570 might decrypt any encrypted data or data updates that are read (during process 575), and might encrypt any data or data update information that are sent (during process 580), in a manner similar to, if not identical to, the processes for encryption and decryption as described in detail above.

Figure 6A:
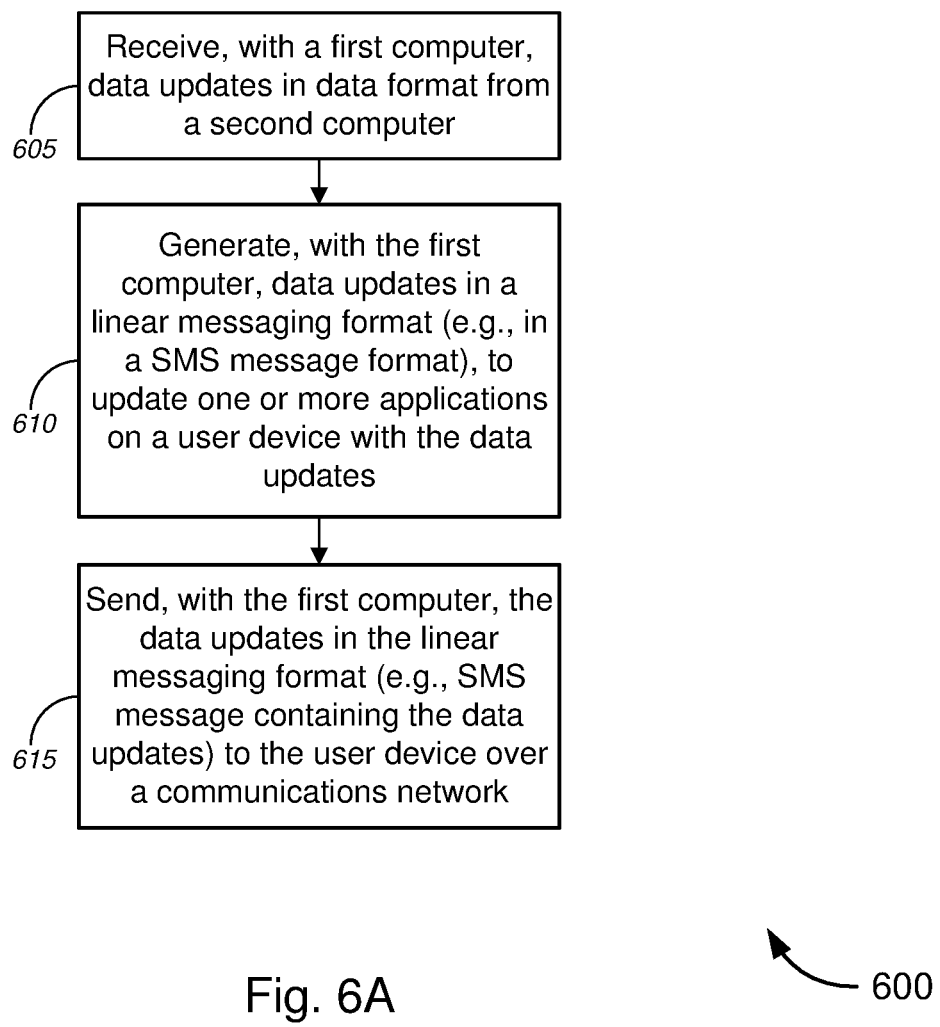
FIGS. 6A-6C are flow diagrams illustrating a method for implementing message-driven data updates by generating and sending data updates in a linear messaging format, in accordance with various embodiments.
Figure 6B:
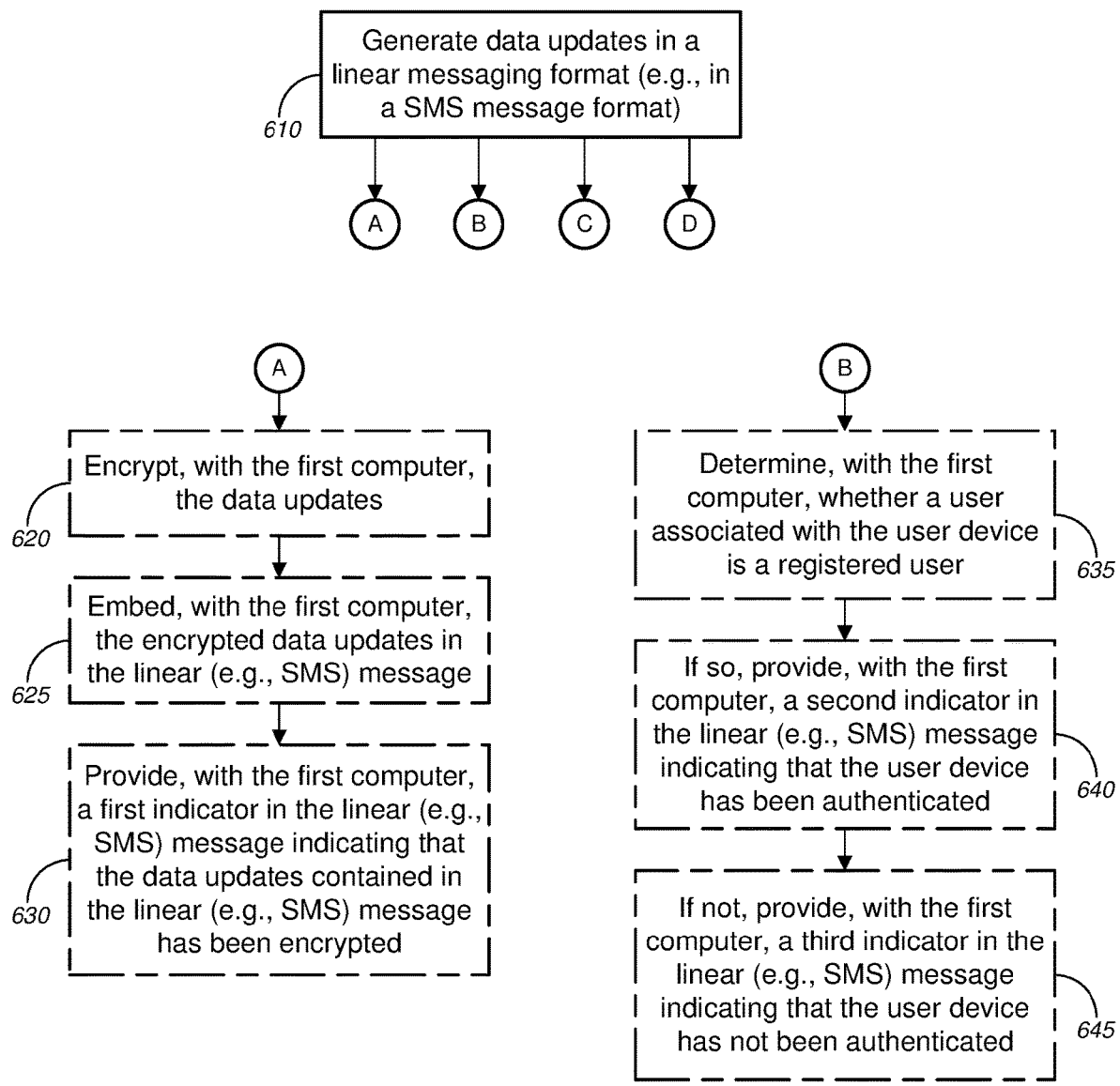
Figure 6C:
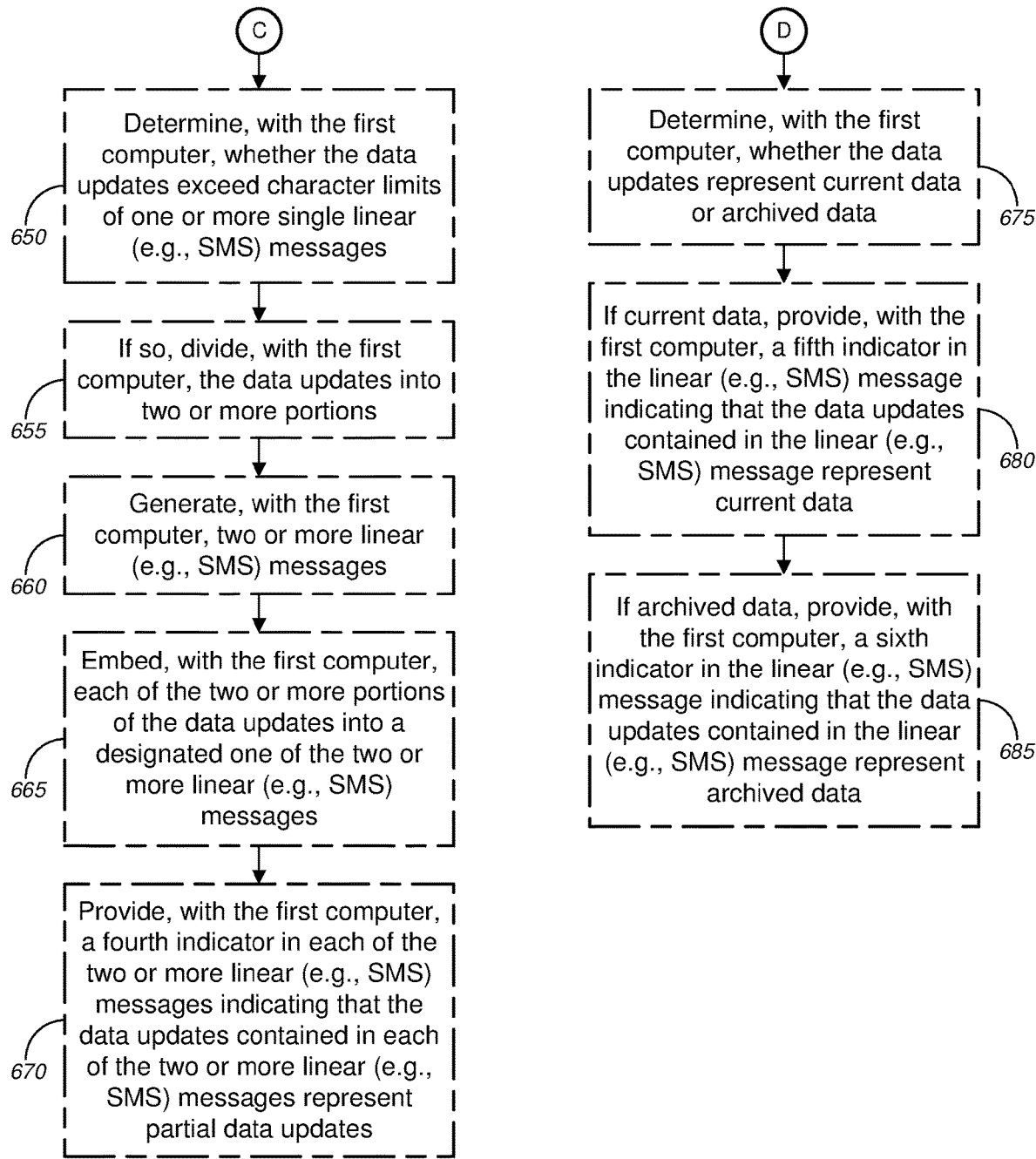

FIGS. 6A-6C (collectively, "FIG. 6") are flow diagrams illustrating a method 600 for implementing message-driven data updates by generating and sending data updates in a linear messaging format, in accordance with various embodiments. The embodiments as represented in FIG. 6 are merely illustrative and are not intended to limit the scope of the various embodiments. With reference to FIG. 6, method 600 in FIG. 6B continues onto FIGS. 6B and 6C, linked by circular markers denoted by "A," "B," "C," and "D." FIGS. 6B and 6C illustrate alternative embodiments for generating data updates in a linear messaging format in block 610 of FIG. 6A.

While the techniques and procedures are depicted and/or described in a certain order for purposes of illustration, it should be appreciated that certain procedures may be reordered and/or omitted within the scope of various embodiments. Moreover, while the method illustrated by FIG. 6 can be implemented by or with (and, in some cases, are described below with respect to) the systems 100, 300, 400 of FIGS. 1, 3, and 4, respectively (or components thereof) as well as message data framework 200 of FIG. 2 and process flows 500 of FIG. 5, such methods may also be implemented using any suitable hardware implementation, data framework, or process flow. Similarly, while each of the systems 100, 300, 400 of FIGS. 1, 3, and 4, respectively (or components thereof) as well as message data framework 200 of FIG. 2 and process flows 500 of FIG. 5 can operate or be used according to the method illustrated by FIG. 6 (e.g., by executing instructions embodied on a computer readable medium), the systems 100, 300, 400 can each also operate according to other modes of operation and/or perform other suitable procedures, and the data framework 200 and process flows 500 each can be used according to other modes of operation and/or perform other suitable procedures.

In the embodiment of FIG. 6A, method 600 might comprise, at block 605, receiving, with a first computer, data updates in a data format from a second computer. At block 610, method 600 might comprise generating, with the first computer, data updates in a linear messaging format (e.g., in a SMS message format), to update one or more applications on a user device with the data updates, based at least in part on the received data updates in data format. Method 615, at block 615, might comprise sending, with the first computer, the data updates in the linear messaging format (e.g., SMS message containing the data updates) to the user device over a communications network (e.g., SMS communications network).

With reference to FIG. 6B, the process of generating data updates in a linear messaging format (e.g., in a SMS message format) might include, without limitation, encrypting the data updates, authenticating a user, splitting data updates into multiple portions, and marking the data as being current or archived, or the like. These various embodiments involved with generating the data updates is depicted by the method continuing from the process at 610 block to optional blocks 620, 635, 650, and 675, linked by circular markers denoted by "A," "B," "C," and "D," respectively.

At optional block 620, method 600 might comprise encrypting, with the first computer, the data updates. Method 600, at optional block 625, might comprise embedding, with the first computer, the encrypted data updates in the linear message (e.g., SMS message). Method 600 might further comprise providing, with the first computer, a first indicator in the linear message (e.g., SMS message) indicating that the data updates contained in the linear (e.g., SMS) message has been encrypted (optional block 630). In some instances, the first indicator might correspond to indicator "S" in security block 205b of FIG. 2.

At optional block 635, method 600 might comprise determining, with the first computer, whether a user associated with the user device is a registered user. Method 600 might further comprise, based on a determination that the user associated with the user device is a registered user, providing, with the first computer, a second indicator in the linear (e.g., SMS) message indicating that the user device has been authenticated (optional block 640). Method 600 might, at optional block 645, comprise, based on a determination that the user associated with the user device is not a registered user, providing, with the first computer, a third indicator in the linear (e.g., SMS) message indicating that the user device has not been authenticated. In some instances, the second and third indicators might correspond to indicators "A" and "X," respectively, in authentication block 205c of FIG. 2.

At optional block 650 (as shown in FIG. 6C), method 600 might comprise determining, with the first computer, whether the data updates exceed character limits of one or more single linear (e.g., SMS) messages. Method 600 might further comprise based on a determination that the data updates exceed the character limits of one or more single linear (e.g., SMS) message, dividing, with the first computer, the data updates into two or more portions (optional block 655), generating, with the first computer, two or more linear (e.g., SMS) messages (optional block 660), and embedding, with the first computer, each of the two or more portions of the data updates into a designated one of the two or more linear (e.g., SMS) messages (optional block 665). Method 600, at optional block 670, might comprise providing, with the first computer, a fourth indicator in each of the two or more linear (e.g., SMS) messages indicating that the data updates contained in each of the two or more linear (e.g., SMS) messages represent partial data updates. In some instances, the fourth indicator might correspond to indicator "P" in condition block 205j of FIG. 2. Alternatively, according to some embodiments, while the first through the second last linear (e.g., SMS) message might include the fourth indicator, the last of the two or more linear (e.g., SMS) messages might include another indicator (that might correspond to indicator "C" in condition block 205i) that might indicate that the entire data update is now complete. In other embodiments, based on a determination that the data updates do not exceed character limits of a single linear (e.g., SMS) message, the other indicator (corresponding to indicator "C" in condition block 205i) might be provided.

At optional block 675, method 600 might comprise determining, with the first computer, whether the data updates represent current data or old (i.e., archived) data. Method 600, at optional block 680, might comprise, based on a determination that the data updates represent current data, providing, with the first computer, a fifth indicator in the linear (e.g., SMS) message indicating that the data updates contained in the linear (e.g., SMS) message represent current data. Method 600 might further comprise, based on a determination that the data updates represent archived data, providing, with the first computer, a sixth indicator in the linear (e.g., SMS) message indicating that the data updates contained in the linear (e.g., SMS) message represent archived data (optional block 685). In some instances, the fifth and sixth indicators might correspond to indicators "L" and "Z," respectively, in blocks 205k and 205l, respectively, of FIG. 2.

Figure 7A:
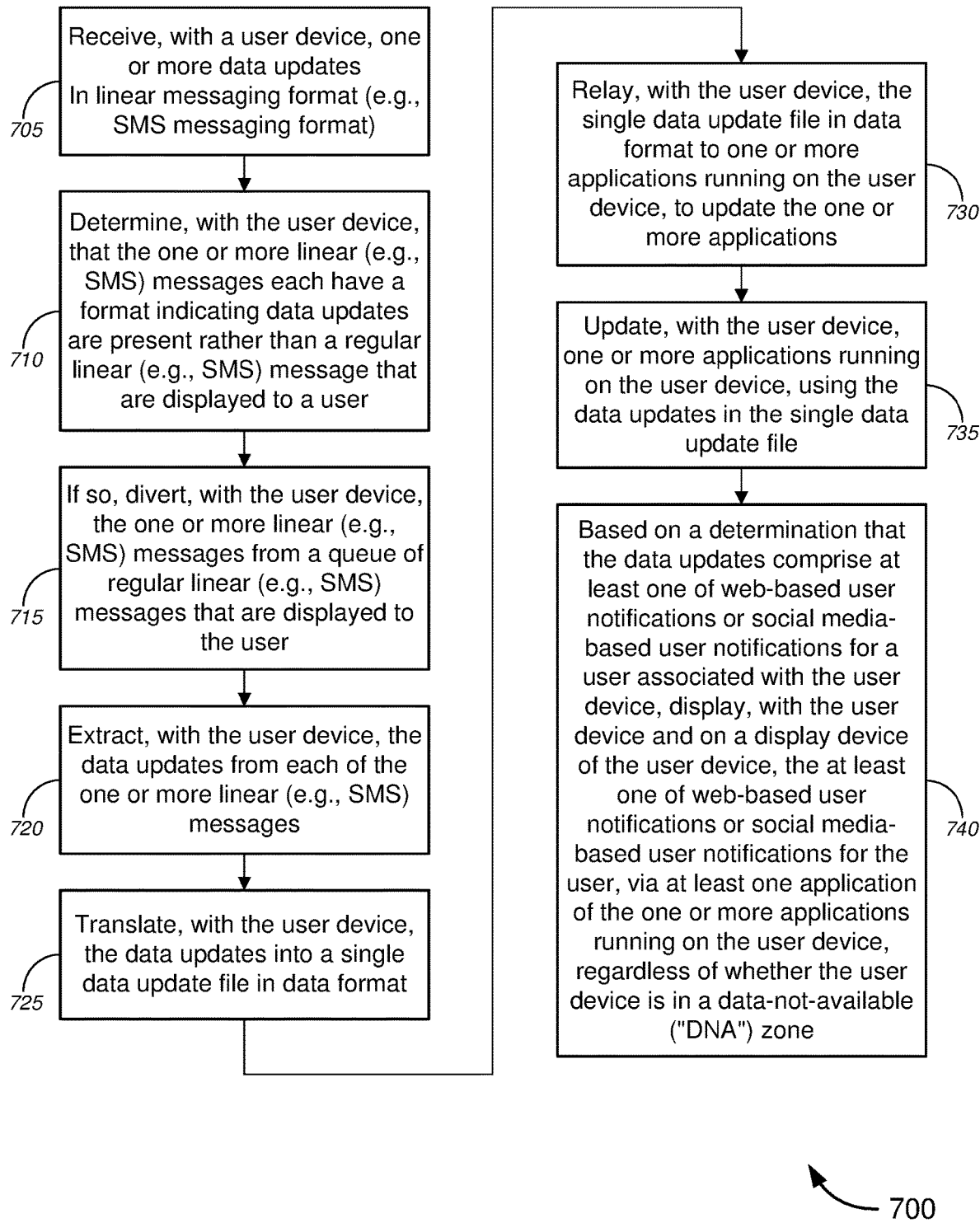
FIGS. 7A-7B are flow diagrams illustrating a method for implementing message-driven data updates by translating and applying data updates that are received in a linear messaging format, in accordance with various embodiments.
Figure 7B:
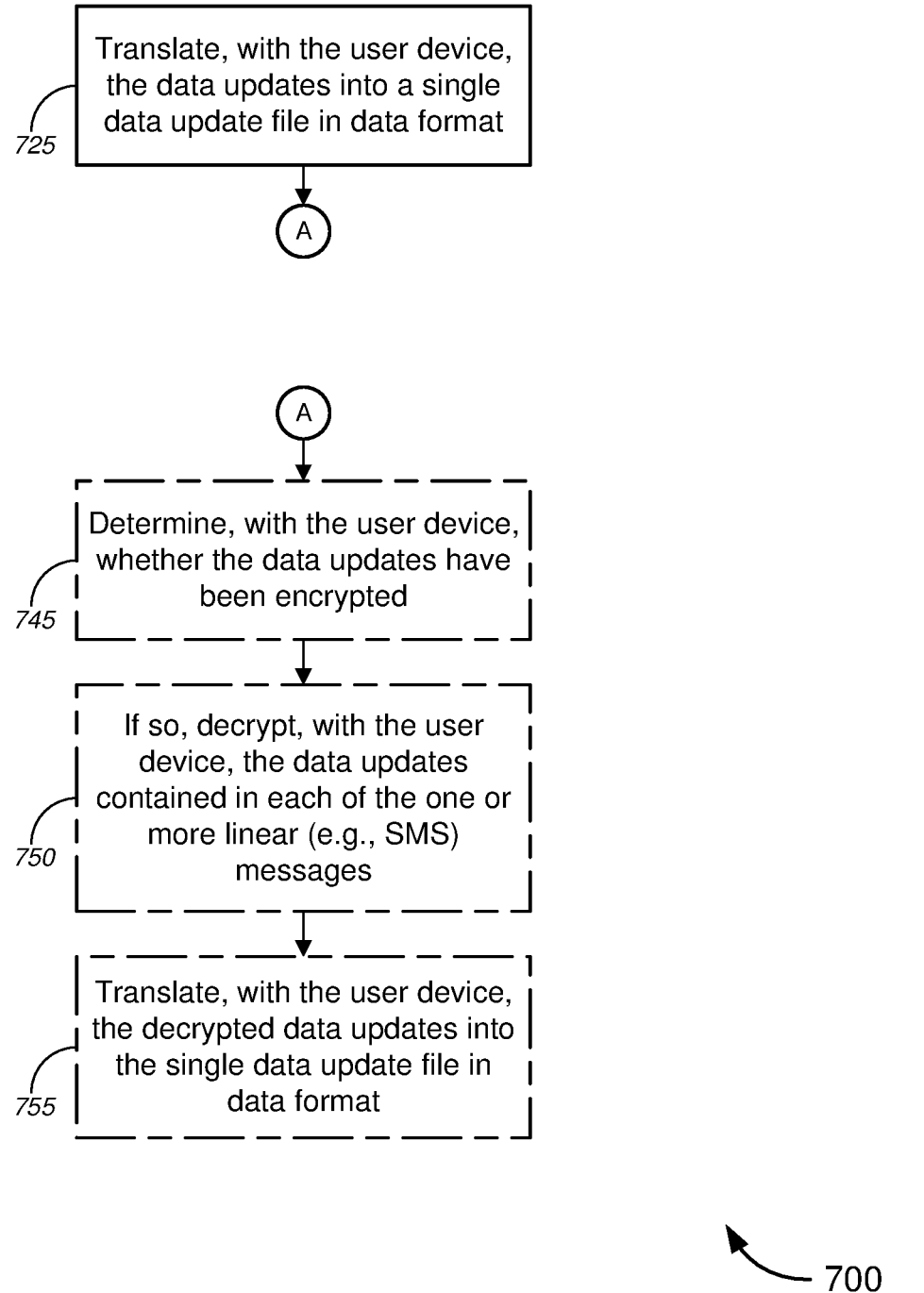

FIGS. 7A-7B (collectively, "FIG. 7") are flow diagrams illustrating a method 700 for implementing message-driven data updates by translating and applying data updates that are received in a linear messaging format, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 7 can be implemented by or with (and, in some cases, are described below with respect to) the systems 100, 300, 400 of FIGS. 1, 3, and 4, respectively (or components thereof) as well as message data framework 200 of FIG. 2 and process flows 500 of FIG. 5, such methods may also be implemented using any suitable hardware implementation, data framework, or process flow. Similarly, while each of the systems 100, 300, 400 of FIGS. 1, 3, and 4, respectively (or components thereof) as well as message data framework 200 of FIG. 2 and process flows 500 of FIG. 5 can operate or be used according to the method illustrated by FIG. 7 (e.g., by executing instructions embodied on a computer readable medium), the systems 100, 300, 400 can each also operate according to other modes of operation and/or perform other suitable procedures, and the data framework 200 and process flows 500 each can be used according to other modes of operation and/or perform other suitable procedures.

Turning to FIG. 7A, method 700 might comprise, at block 705, receiving, with a user device, one or more data updates in linear messaging format (e.g., in SMS messaging format). At block 710, method 700 might comprise determining, with the user device, that the one or more linear (e.g., SMS) messages each have a format indicating data updates are present rather than a regular linear (e.g., SMS) message that are displayed to a user (i.e., regular communications linear (e.g., SMS) message addressed to the user, not necessarily addressed to the device associated with the user). Method 700 might further comprise, based on such a determination, diverting, with the user device, the one or more linear (e.g., SMS) messages from a queue of regular (i.e., communications) linear (e.g., SMS) messages that are displayed to the user (block 715). At block 720, method 700 might comprise extracting, with the user device, the data updates from each of the one or more linear (e.g., SMS) messages. Method 700, at block 725, might comprise translating, with the user device, the data updates into a single data update file in data format. Method 700 might further comprise, at block 730, relaying, with the user device, the single data update file in data format to one or more applications running on the user device, to update the one or more applications. At block 735, method 700 might comprise updating, with the user device, one or more applications running on the user device, using the data updates in the single data update file. In some cases, the single data update file might include header information that might indicate which of the one or more applications to update.

Method 700, at block 740, might comprise, based on a determination that the data updates comprise at least one of web-based user notifications or social media-based user notifications for a user associated with the user device, displaying, with the user device and on a display device of the user device, the at least one of web-based user notifications or social media-based notifications for the user, via at least one application of the one or more applications running on the user device, regardless of whether the user device is in a data-not-available ("DNA") zone.

With reference to FIG. 7B, the process of translating, with the user device, the data updates into a single data update file in data format of block 725 of FIG. 7A might further include sub-processes that are depicted by the method continuing from the process at block 725 to optional blocks 745, linked by circular markers denoted by "A." At optional block 745, method 700 might comprise determining, with the user device, whether the data updates have been encrypted. Method 700, at optional block 750, might comprise, based on a determination that the data updates are encrypted, decrypting, with the user device, the data updates contained in each of the one or more linear (e.g., SMS) messages. Method 700 might further comprise, translating, with the user device, the decrypted data updates into the single data update file in data format (optional block 755).

Exemplary System and Hardware Implementation

Figure 8:
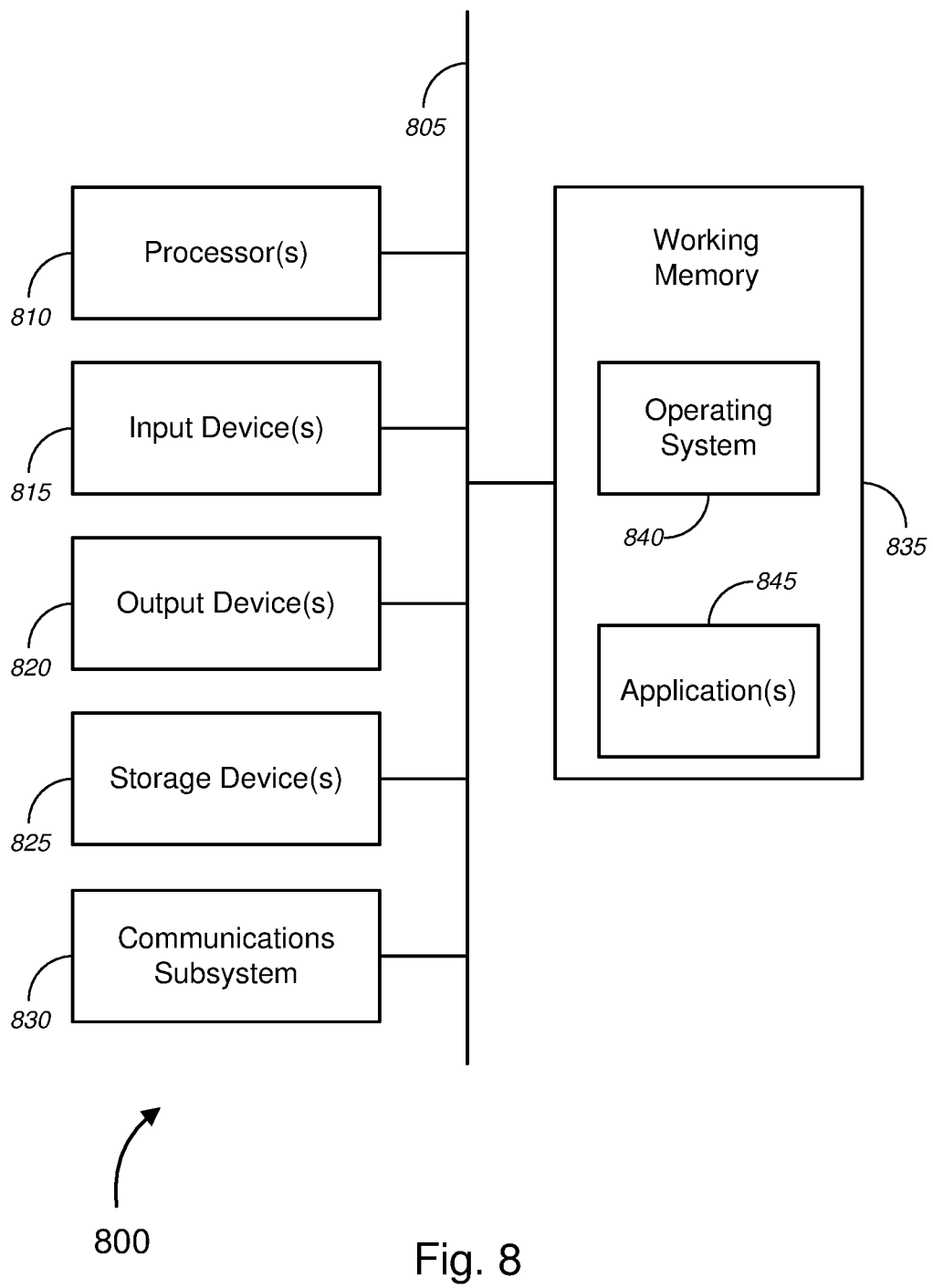
FIG. 8 is a block diagram illustrating an exemplary computer or system hardware architecture, in accordance with various embodiments.

FIG. 8 is a block diagram illustrating an exemplary computer or system hardware architecture, in accordance with various embodiments. FIG. 8 provides a schematic illustration of one embodiment of a computer system 800 of the service provider system hardware that can perform the methods provided by various other embodiments, as described herein, and/or can perform the functions of server or MSC 105, application servers 135, server 405 or 520, user devices 110, client devices 535, and/or the like, as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the server or MSC 105, application servers 135, server 405 or 520, user devices 110, client devices 535, and/or the like, as described above with respect to FIGS. 1-7—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as digital signal processing chips, graphics acceleration processors, and/or the like); one or more input devices 815, which can include, without limitation, a mouse, a keyboard and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
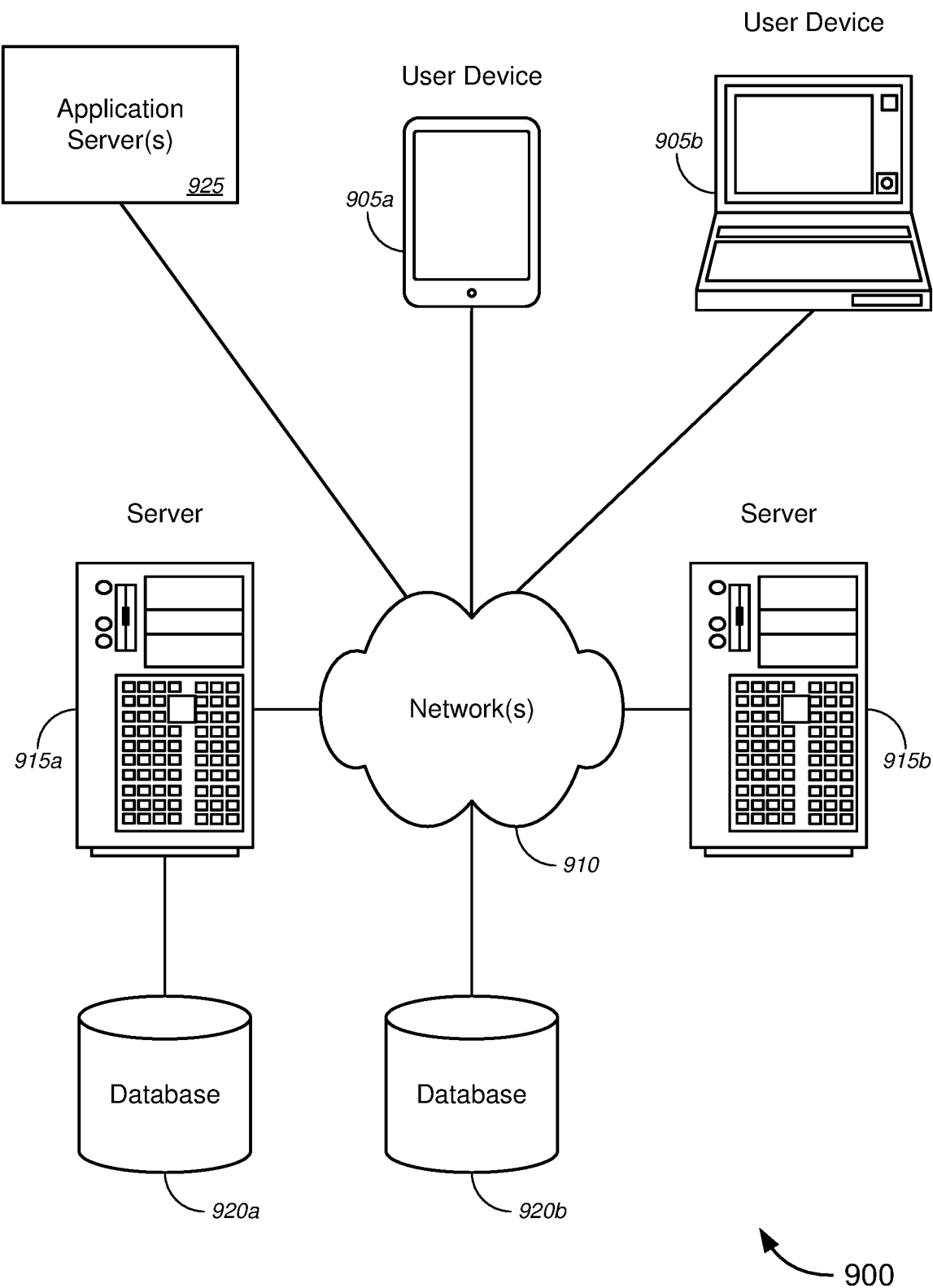
FIG. 9 is a block diagram illustrating a networked system of computers, computing systems, or system hardware architecture, which can be used in accordance with various embodiments.

As noted above, a set of embodiments comprises methods and systems for implementing message-driven data updates. FIG. 9 illustrates a schematic diagram of a system 900 that can be used in accordance with one set of embodiments. The system 900 can include one or more user computers or user devices 905. A user computer or user device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 905 can also have any of a variety of applications, including one or more applications configured to perform methods provided by various embodiments (as described above, for example), as well as one or more office applications, database client and/or server applications, and/or web browser applications. Alternatively, a user computer or user device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with three user computers or user devices 905, any number of user computers or user devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 910 can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 905 and/or another server 915. In some embodiments, an application server, user device, or server can perform one or more of the processes for implementing message-driven data updates, or the like, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer or user device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920a might reside on a storage medium local to (and/or resident in) a server 915a (and/or a user computer or user device 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise one or more application servers 925, as described in detail above with respect to FIGS. 1-7. In some embodiments, one or more of the user device 905a, the user device 905b, the server 915a, the server 915b, the database 920a, and/or the database 920b might be in the same network 910 as one of the applications server(s) 925. In alternative or additional embodiments, one or more of the user device 905a, the user device 905b, the server 915a, the server 915b, the database 920a, and/or the database 920b might be in a first network 910 that is different from another network(s) 910 in which each of the application server(s) 925 is located.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a user device, one or more short message service ("SMS") messages containing data updates; and
   determining, with the user device, that the one or more SMS messages each have a format indicating data updates are present rather than a regular SMS message that are displayed to a user;
   based on such determination, diverting, with the user device, the one or more SMS messages from a queue of regular SMS messages that are displayed to the user;
   extracting, with the user device, the data updates from each of the one or more SMS messages;
   translating, with the user device, the data updates into a single data update file in data format;
   determining, with the user device, whether the data updates represent current data or archived data; and
   based on a determination that the data updates represent current data, relaying, with the user device, the single data update file in data format to one or more applications running on the user device, to update the one or more applications using the data updates in the single data update file, or
   based on a determination that the data updates represent archived data, relaying, with the user device, the single data update file in data format to the one or more applications when the one or more applications request the archived data.

2. The method of claim 1, wherein the format indicating data updates are present comprises a first predetermined number of bits indicating a start of a message, a second predetermined number of bits indicating whether the SMS message is encrypted, a third predetermined number of bits indicating whether the user is a registered user, fourth and fifth predetermined numbers of bits indicating a template of the SMS message, a sixth predetermined number of bits containing the data updates, seventh and eighth predetermined numbers of bits indicating bits that are reserved for future processing, ninth and tenth predetermined numbers of bits indicating whether the data updates are being sent over multiple SMS messages, eleventh and twelfth predetermined numbers of bits indicating whether the data updates are current data or archived data, and a thirteenth predetermined number of bits indicating an end of the message.

3. The method of claim 1, further comprising:
   determining, with the user device, whether the data updates have been encrypted;
   wherein, based on a determination that the data updates have been encrypted, translating the data updates into a single data update file in data format comprises:
   decrypting, with the user device, the data updates contained in each of the one or more SMS messages; and
   translating, with the user device, the decrypted data updates into the single data update file in data format.

4. The method of claim 1, further comprising:
   relaying, with the user device, the single data update file in data format to one or more applications running on the user device, to update the one or more applications; and
   updating, with the user device, one or more applications running on the user device, using the data updates in the single data update file.

5. The method of claim 4, wherein the single data update file comprises information in a header that indicates the one or more applications to update.

6. The method of claim 1, wherein, based on a determination that the data updates comprise at least one of web-based user notifications or social media-based user notifications for a user associated with the user device, the method further comprises:
displaying, with the user device and on a display device of the user device, the at least one of web-based user notifications or social media-based user notifications for the user, via at least one application of the one or more applications running on the user device, regardless of whether the user device is in a data-not-available ("DNA") zone.

7. The method of claim 1, further comprising:
determining, with the user device, whether a user associated with the user device is a registered user;
based on a determination that the user associated with the user is a registered user, decrypting, with the user device, the data updates contained in each of the one or more SMS messages.

8. A system, comprising:
a first computer, comprising:
at least one first processor; and
a first non-transitory computer readable medium in communication with the at least one first processor, the first non-transitory computer readable medium having stored thereon computer software comprising a first set of instructions that, when executed by the at least one first processor, causes the first computer to perform one or more functions, the first set of instructions comprising:
instructions for generating one or more short message service ("SMS") messages containing data updates, the one or more SMS messages each having a format that triggers a data update analyzer in a user device to intercept the one or more SMS messages and to divert the one or more SMS messages from a queue of regular SMS messages for display to a user; and
instructions for sending the one or more SMS messages containing the data updates to the user devices over a communications network;
the user device, comprising:
at least one second processor; and
a second non-transitory computer readable medium in communication with the at least one second processor, the second non-transitory computer readable medium having stored thereon computer software comprising a second set of instructions that, when executed by the at least one second processor, causes the user device to perform one or more functions, the second set of instructions comprising:
instructions for receiving the one or more SMS messages containing data updates;
instructions for determining that the one or more SMS messages each have a format indicating data updates are present rather than a regular SMS message for display to a user;
instructions for, based on such determination, diverting the one or more SMS messages from a queue of regular SMS messages for display to the user;
instructions for extracting the data updates from each of the one or more SMS messages;
instructions for translating the data updates into a single data update file in data format;
instructions for determining, with the user device, whether the data updates represent current data or archived data; and
instructions for relaying, with the user device, the single data update file in data format to one or more applications running on the user device using the data updates in the single update data file based on a determination that the data updates represent current data, or
instructions for relaying, with the user device, the single data update file in data format to the one or more applications when the one or more applications request the archived data based on a determination that the date updates represent archived data.

9. The system of claim 8, wherein the format indicating data updates are present comprises a first predetermined number of bits indicating a start of a message, a second predetermined number of bits indicating whether the SMS message is encrypted, a third predetermined number of bits indicating whether the user is a registered user, fourth and fifth predetermined numbers of bits indicating a template of the SMS message, a sixth predetermined number of bits containing the data updates, seventh and eighth predetermined numbers of bits indicating bits that are reserved for future processing, ninth and tenth predetermined numbers of bits indicating whether the data updates are being sent over multiple SMS messages, eleventh and twelfth predetermined numbers of bits indicating whether the data updates are current data or archived data, and a thirteenth predetermined number of bits indicating an end of the message.

10. The system of claim 8, wherein the second set of instructions further comprise:
instructions for determining whether the data updates have been encrypted;
wherein, based on a determination that the data updates have been encrypted, instructions for translating the data updates into a single data update file in data format comprise:
instructions for decrypting the data updates contained in each of the one or more SMS messages; and
instructions for translating the decrypted data updates into the single data update file in data format.

11. The system of claim 8, wherein the second set of instructions further comprise:
instructions for relaying the single data update file in data format to one or more applications running on the user device, to update the one or more applications; and
instructions for updating one or more applications running on the user device, using the data updates in the single data update file.

12. The system of claim 8, wherein, based on a determination that the data updates comprise at least one of web-based user notifications or social media-based user notifications for a user associated with the user device, the second set of instructions further comprise:
instructions for displaying, on a display device of the user device, the at least one of web-based user notifications or social media-based user notifications for the user, via at least one application of the one or more applications running on the user device, regardless of whether the user device is in a data-not-available ("DNA") zone.

13. A user device, comprising:
at least one processor; and
a non-transitory computer readable medium in communication with the at least one processor, the non-transitory computer readable medium having stored thereon computer software comprising a set of instructions that, when executed by the at least one processor, causes the user device to perform one or more functions, the set of instructions comprising:

instructions for receiving one or more short message service ("SMS") messages containing data updates, the one or more SMS messages each having a format that triggers a data update analyzer in a user device to intercept the one or more SMS messages and to divert the one or more SMS messages from a queue of regular SMS messages for display to a user;

instructions for determining that the one or more SMS messages each have a format indicating data updates are present rather than a regular SMS message for display to a user;

instructions for, based on such determination, diverting the one or more SMS messages from a queue of regular SMS messages for display to the user;

instructions for extracting the data updates from each of the one or more SMS messages;

instructions for translating the data updates into a single data update file in data format;

instructions for determining whether the data updates represent current data or archived data; and instructions for relaying, with the user device, the single data update file in data format to one or more applications running on the user device using the data updates in the single update data file based on a determination that the data updates represent current data, or instructions for relaying, with the user device, the single data update file in data format to the one or more applications when the one or more applications request the archived data based on a determination that the date updates represent archived data.

14. The user device of claim 13, wherein the format indicating data updates are present comprises a first predetermined number of bits indicating a start of a message, a second predetermined number of bits indicating whether the SMS message is encrypted, a third predetermined number of bits indicating whether the user is a registered user, fourth and fifth predetermined numbers of bits indicating a template of the SMS message, a sixth predetermined number of bits containing the data updates, seventh and eighth predetermined numbers of bits indicating bits that are reserved for future processing, ninth and tenth predetermined numbers of bits indicating whether the data updates are being sent over multiple SMS messages, eleventh and twelfth predetermined numbers of bits indicating whether the data updates are current data or archived data, and a thirteenth predetermined number of bits indicating an end of the message.

15. The user device of claim 13, wherein the set of instructions further comprise:
  instructions for determining whether the data updates have been encrypted;
  wherein, based on a determination that the data updates have been encrypted, instructions for translating the data updates into a single data update file in data format comprise:
  instructions for decrypting the data updates contained in each of the one or more SMS messages; and
  instructions for translating the decrypted data updates into the single data update file in data format.

16. The user device of claim 13, wherein the set of instructions further comprise:
  instructions for relaying the single data update file in data format to one or more applications running on the user device, to update the one or more applications; and
  instructions for updating one or more applications running on the user device, using the data updates in the single data update file.

17. The user device of claim 16, wherein the single data update file comprises information in a header that indicates the one or more applications to update.

18. The user device of claim 13, wherein, based on a determination that the data updates comprise at least one of web-based user notifications or social media-based user notifications for a user associated with the user device, the set of instructions further comprise:
  instructions for displaying, on a display device of the user device, the at least one of web-based user notifications or social media-based user notifications for the user, via at least one application of the one or more applications running on the user device, regardless of whether the user device is in a data-not-available ("DNA") zone.

19. The user device of claim 13, wherein the set of instructions further comprise:
  instructions for determining whether the data updates represent current data or archived data;
  based on a determination that the data updates represent current data, instructions for relaying the single data update file in data format to one or more applications and updating the one or more applications running on the user device, using the data updates in the single data update file; and
  based on a determination that the data updates represent archived data, instructions for relaying the single data update file in data format to the one or more applications when the one or more applications request the archived data.

* * * * *